(12) United States Patent
Tuerk et al.

(10) Patent No.: US 8,889,788 B2
(45) Date of Patent: Nov. 18, 2014

(54) DISPERSIONS OF POLYURETHANES, THEIR PREPARATION AND USE

(75) Inventors: Holger Tuerk, Mannheim (DE); Paul Andrew Simpson, Ludwigshafen (DE); Gernot Diehlmann, Lampertheim (DE)

(73) Assignee: BASF SE, Ludwigshafen (DE)

( * ) Notice: Subject to any disclaimer, the term of this patent is extended or adjusted under 35 U.S.C. 154(b) by 827 days.

(21) Appl. No.: 12/527,431

(22) PCT Filed: Feb. 13, 2008

(86) PCT No.: PCT/EP2008/051757
§ 371 (c)(1),
(2), (4) Date: Aug. 17, 2009

(87) PCT Pub. No.: WO2008/098972
PCT Pub. Date: Aug. 21, 2008

(65) Prior Publication Data
US 2010/0075115 A1 Mar. 25, 2010

(30) Foreign Application Priority Data

Feb. 15, 2007 (EP) .................................... 07102502

(51) Int. Cl.
| | |
|---|---|
| *B05D 3/02* | (2006.01) |
| *B32B 27/00* | (2006.01) |
| *B32B 27/40* | (2006.01) |
| *B41J 2/01* | (2006.01) |
| *B41J 2/17* | (2006.01) |
| *B41J 2/175* | (2006.01) |
| *C08G 18/08* | (2006.01) |
| *C08K 3/20* | (2006.01) |
| *C08K 9/00* | (2006.01) |
| *C08L 75/00* | (2006.01) |
| *C09B 67/00* | (2006.01) |
| *C09D 5/00* | (2006.01) |
| *C09D 11/00* | (2014.01) |
| *G01D 11/00* | (2006.01) |
| *C09B 67/46* | (2006.01) |
| *C08G 18/67* | (2006.01) |
| *C08G 18/66* | (2006.01) |
| *C09B 67/08* | (2006.01) |
| *C09D 175/16* | (2006.01) |
| *C08K 5/13* | (2006.01) |
| *C08G 18/78* | (2006.01) |
| *C09D 11/322* | (2014.01) |
| *C08K 3/00* | (2006.01) |
| *C08K 5/00* | (2006.01) |

(52) U.S. Cl.
CPC .......... *C08G 18/7837* (2013.01); *C09B 67/009* (2013.01); *C08G 18/672* (2013.01); *C08G 18/6659* (2013.01); *C09B 67/0013* (2013.01); *C09D 175/16* (2013.01); *C08K 3/0033* (2013.01); *C08K 5/13* (2013.01); *C08K 5/0041* (2013.01); *C09D 11/322* (2013.01)
USPC ................. 524/591; 8/637.1; 347/1; 347/85; 347/95; 347/100; 427/372.2; 427/385.5; 428/423.1; 523/160; 523/161; 523/200; 523/205; 523/206; 524/839; 524/840

(58) Field of Classification Search
USPC .......... 523/160, 161, 200, 205, 206; 524/591, 524/839, 840; 428/423.1; 427/372.2, 385.5; 347/1, 85, 95, 100; 8/637.1
See application file for complete search history.

(56) References Cited

U.S. PATENT DOCUMENTS

| | | |
|---|---|---|
| 5,623,001 A | 4/1997 | Figov |
| 6,617,413 B1 | 9/2003 | Bruchmann et al. |
| 6,747,088 B1 | 6/2004 | Schwalm et al. |
| 2007/0166548 A1 | 7/2007 | Gruber et al. |

FOREIGN PATENT DOCUMENTS

| | | | |
|---|---|---|---|
| CA | 2598569 | * | 8/2006 |
| DE | 196 18 720 | | 11/1996 |
| DE | 198 26 712 | | 12/1999 |
| DE | 199 13 353 | | 9/2000 |
| EP | 0 007 508 | | 2/1980 |
| EP | 0 057 474 | | 8/1982 |
| EP | 0 495 751 | | 7/1992 |
| EP | 0 615 980 | | 9/1994 |
| EP | 0 993 495 | | 4/2000 |
| EP | 1 144 476 | | 12/2003 |
| WO | 98 33761 | | 8/1998 |
| WO | 01 23453 | | 4/2001 |
| WO | 2005 080484 | | 9/2005 |
| WO | 2006 089933 | | 8/2006 |
| WO | 2006 089935 | | 8/2006 |
| WO | WO 2006/089933 A1 | | 8/2006 |

OTHER PUBLICATIONS

Kunststoffhandbuch/Saechtling, 26$^{th}$ edition, Carl-Hanser-Verlag, Munich, 1995, 8 pages (26th edition not available, submitting 28$^{th}$ edition).

(Continued)

*Primary Examiner* — Patrick Niland
(74) *Attorney, Agent, or Firm* — Oblon, Spivak, McClelland, Maier & Neustadt, L.L.P.

(57) ABSTRACT

The present invention provides aqueous dispersions comprising a pigment (B) at least partially enveloped by polyurethane (A) and further comprising at least one polymerization inhibitor (C), said polyurethane (A) being obtainable by reaction of
(a) 15% to 70% by weight of di- or polyisocyanate comprising on average from 1 to 10 allophanate groups and on average from 1 to 10 C—C double bonds per molecule, and optionally
(b) 0% to 60% by weight of further di- or polyisocyanate, with
(c) 5% to 50% by weight of compound having at least two isocyanate-reactive groups,
weight % ages being based on total polyurethane (A).

24 Claims, No Drawings

(56) References Cited

OTHER PUBLICATIONS

Eva Malmström, et al., "Hyperbranched Polymers: A Review", J.M.S.—Rev. Macromol. Chem. Phys., C37 (3), 1997, pp. 555-579.

Werner J. Blank, et al., "Catalysis of the isocyanate-hydroxyl reaction by non-tin catalysts", Progress in Organic Coatings, vol. 35, 1999, pp. 19-29.

J. Hutchison, et al., "Advances in Polymer Science: Photoinitation of Vinyl Polymerization by Aromatic Carbonyl Compounds", Advances in Polymer Science, vol. 14, Springer Berlin, 1974, pp. 49-86.

K.K. Dietliker, "Chemistry & Technology of UV & EB Formulation for Coatings, Inks & Paints", vol. 3, Photoinitiators for Free Radical and Cationic Polymerisation, P.K.T. Oldring (Eds), SITA Technology Ltd., 1991, pp. 115-297.

Text. Chem. Color, vol. 19 (8), pp. 23-29, 1987 and vol. 21 (6), pp. 27-32, 1989.

U.S. Appl. No. 13/523,363, filed Jun. 14, 2012, Schwalm, et al.

\* cited by examiner

DISPERSIONS OF POLYURETHANES, THEIR PREPARATION AND USE

CROSS REFERENCE TO RELATED APPLICATION

This application is a 371 of PCT/EP08/051757, filed on Feb. 13, 2008, and claims priority to European Patent Application No. 07102503.7, filed on Feb. 15, 2007.

The present invention provides aqueous dispersions comprising a pigment (B) at least partially enveloped by a polyurethane (A) and further comprising at least one polymerization inhibitor (C), said polyurethane (A) being obtainable by reaction of
(a) 15% to 70% by weight of di- or polyisocyanate comprising on average from 1 to 10 allophanate groups and on average from 1 to 10 C—C double bonds per molecule, and optionally
(b) 0% to 60% by weight of further di- or polyisocyanate, with
(c) 5% to 50% by weight of compound having at least two isocyanate-reactive groups,
weight % ages being based on total polyurethane (A).

The present invention further relates to the production of at least partially enveloped pigments according to the present invention and of aqueous dispersions according to the present invention and also to their use.

It is frequently necessary to disperse pigments in a liquid and, in particular, aqueous medium in order that they may be further processed to form, for example, recording fluids and, in particular, inks. Particularly strict requirements are placed in this connection on inks used in the ink jet process (such as thermal ink jet, piezo ink jet, continuous ink jet, valve jet, transfer printing processes): they have to have a viscosity and surface tension suitable for printing, they have to be stable in storage, i.e., they should not coagulate or flocculate, and they must not lead to cloggage of printer nozzles, which can be problematical particularly in the case of inks comprising dispersed, i.e., undissolved, colorant particles. Stability in storage further requires of these recording fluids and in particular inks that dispersed colorant particles do not sediment. Furthermore, in the case of continuous ink jet the inks shall be stable to the addition of conducting salts and be free of any tendency to floc out with an increase in the ion content. In addition, the prints obtained have to meet colorists' requirements, i.e., exhibit brilliance and depth of shade, and have good fastnesses, for example dry rub fastness, light fastness, water fastness and wet rub fastness, if appropriate after aftertreatment such as fixation for example, and good drying.

To ensure particularly good fastnesses such as for example dry rub fastness, wet rub fastness and wash fastness for printed substrates, prints can be fixed through so-called radiation curing. So-called radiation-curable inks may be employed for this purpose, see for example U.S. Pat. No. 5,623,001 and EP 0 993 495. Radiation-curable ink jet inks typically comprise a material which can be cured by subjecting it to actinic radiation. In addition, a photoinitiator may be included in radiation-curable ink jet inks.

WO 2006/089933 discloses aqueous dispersions comprising radiation-curable polyurethanes comprising allophanate groups, and also the use of said dispersions in ink jet inks. Printing the disclosed ink jet inks and applying actinic radiation gives printed substrates having very good fastnesses. In many cases, however, it is actually not desirable to have to be reliant on actinic radiation to cure the prints. Uniform curing of prints on non-planar substrates presupposes an optimized geometry for the sources of radiation, which is not always ensurable. Thermal curing of the inks disclosed in WO 2006/089933, however, is possible in those cases only in which the inks in question have been produced without stabilizer (free-radical scavenger, polymerization inhibitor). Such inks, in contrast, have a limited shelf life in some cases.

The present invention has for its object to provide aqueous dispersions of pigments. The present invention further has for its object to provide inks for the ink jet process which are particularly efficiently curable by the application of actinic radiation and/or thermally and also have a long shelf life. The present invention further has for its object to provide processes for producing inks for the ink jet process. The present invention finally has for its object to provide printed substrates and, in particular, printed textile substrates having a particularly good hand and good fastnesses.

We have found that this object is achieved by aqueous dispersions defined at the beginning.

As used herein, the expressions "inks for the ink jet process" and "ink jet inks" are equivalent.

Polyurethanes shall for the purposes of the present invention be understood as meaning not just such polymers as are exclusively linked by urethane groups but in a more general sense polymers obtainable by reaction of di- or polyisocyanates with compounds comprising active hydrogen atoms. Polyurethanes for the purposes of the present invention thus may comprise urea, allophanate, biuret, carbodiimide, amide, ester, ether, uretoneimine, uretidione, isocyanurate or oxazolidine groups as well as urethane groups. As a general reference there may be cited by way of example: Kunststoffhandbuch/Saechtling, 26th edition, Carl-Hanser-Verlag, Munich 1995, pages 491 et seq. More particularly, polyurethanes for the purposes of the present invention comprise allophanate groups.

In one embodiment of the present invention, the polyurethane (A) is not a hyperbranched polyurethane. Hyperbranched polyurethanes are known as such and are described for example in J. M. S.—Rev. Macromol. Chem. Phys. 1997, C37(3), 555.

Aqueous dispersions according to the present invention comprise a pigment (B) at least partially enveloped by a polyurethane (A).

In what follows, "pigment at least partially enveloped by at least one polyurethane" is to be understood as meaning such a pigment in particulate form whose outer surface is wholly or partly covered by polyurethane (A). Mixtures of pigment in particulate form in each of which a certain percentage of the pigmentary particles is not enveloped by polyurethane (A) and in each of which the outer surface of the other pigmentary particles is wholly or partly covered by polyurethane (A) likewise come within the definition of "pigment at least partially enveloped by a polyurethane (A)".

Polyurethane (A) may comprise one or more polyurethanes (A). In the case of two or more polyurethanes, numerical data in connection with polyurethane (A) are always based on the totality of polyurethanes (A).

In one embodiment of the present invention, pigment at least partially enveloped by at least one polyurethane (A) has at least 10%, preferably at least 20% and more preferably at least 30% of its outer surface covered by polyurethane (A).

The degree of envelopment can be determined for example by measuring the zeta potential, through microscopic methods such as for example optical microscopy or methods of electron microscopy (TEM, cryo-TEM, SEM) and, quite specifically, with the aid of the freeze fracture preparation technique, NMR spectroscopy or photoelectron spectroscopy on dried at least partially enveloped pigment.

At least partially to be enveloped pigments (B) are obtained in the realm of the present invention by at least partial envelopment of virtually water-insoluble, finely divided, organic or inorganic colorants as per the definition in German standard specification DIN 55944. Aqueous dispersions according to the present invention are preferably produced from organic pigments, which comprises carbon black. Examples of particularly suitable pigments (B) will now be recited.

Organic Pigments:

Monoazo pigments: C.I. Pigment Brown 25; C.I. Pigment Orange 5, 13, 36 and 67; C.I. Pigment Red 1, 2, 3, 5, 8, 9, 12, 17, 22, 23, 31, 48:1, 48:2, 48:3, 48:4, 49, 49:1, 52:1, 52:2, 53, 53:1, 53:3, 57:1, 63, 112, 146, 170, 184, 210, 245 and 251; C.I. Pigment Yellow 1, 3, 73, 74, 65, 97, 151 and 183;

Disazo pigments: C.I. Pigment Orange 16, 34 and 44; C.I. Pigment Red 144, 166, 214 and 242; C.I. Pigment Yellow 12, 13, 14, 16, 17, 81, 83, 106, 113, 126, 127, 155, 174, 176 and 188;

Anthanthrone pigments: C.I. Pigment Red 168 (C.I. Vat Orange 3);

Anthraquinone pigments: C.I. Pigment Yellow 147 and 177; C.I. Pigment Violet 31;

Anthraquinone pigments: C.I. Pigment Yellow 147 and 177; C.I. Pigment Violet 31;

Anthrapyrimidine pigments: C.I. Pigment Yellow 108 (C.I. Vat Yellow 20);

Quinacridone pigments: C.I. Pigment Red 122, 202 and 206; C.I. Pigment Violet 19;

Quinophthalone pigments: C.I. Pigment Yellow 138;

Dioxazine pigments: C.I. Pigment Violet 23 and 37;

Flavanthrone pigments: C.I. Pigment Yellow 24 (C.I. Vat Yellow 1);

Indanthrone pigments: C.I. Pigment Blue 60 (C.I. Vat Blue 4) and 64 (C.I. Vat Blue 6);

Isoindoline pigments: C.I. Pigment Orange 69; C.I. Pigment Red 260; C.I.

Pigment Yellow 139 and 185;

Isoindolinone pigments: C.I. Pigment Orange 61; C.I. Pigment Red 257 and 260; C.I. Pigment Yellow 109, 110, 173 and 185;

Isoviolanthrone pigments: C.I. Pigment Violet 31 (C.I. Vat Violet 1);

Metal complex pigments: C.I. Pigment Yellow 117, 150 and 153; C.I. Pigment Green 8;

Perinone pigments: C.I. Pigment Orange 43 (CA. Vat Orange 7); C.I. Pigment Red 194 (C.I. Vat Red 15);

Perylene pigments: C.I. Pigment Black 31 and 32; C.I. Pigment Red 123, 149, 178, 179 (C.I. Vat Red 23), 190 (CA. Vat Red 29) and 224; C.I. Pigment Violet 29;

Phthalocyanine pigments: C.I. Pigment Blue 15, 15:1, 15:2, 15:3, 15:4, 15:6 and 16; C.I. Pigment Green 7 and 36;

Pyranthrone pigments: C.I. Pigment Orange 51; C.I. Pigment Red 216 (C.I. Vat Orange 4);

Thioindigo pigments: C.I. Pigment Red 88 and 181 (C.I. Vat Red 1); C.I. Pigment Violet 38 (C.I. Vat Violet 3);

Triarylcarbonium pigments: C.I. Pigment Blue 1, 61 and 62; C.I. Pigment Green 1; C.I. Pigment Red 81, 81:1 and 169; C.I. Pigment Violet 1, 2, 3 and 27; C.I. Pigment Black 1 (aniline black);

C.I. Pigment Yellow 101 (aldazine yellow);

C.I. Pigment Brown 22.

Inorganic Pigments:

White pigments: titanium dioxide (C.I. Pigment White 6), zinc white, pigmented zinc oxide, barium sulfate, zinc sulfide, lithopones; lead white;

Black pigments: iron oxide black (C.I. Pigment Black 11), iron-manganese black, spinell black (C.I. Pigment Black 27); carbon black (C.I. Pigment Black 7);

Color pigments: chromium oxide, chromium oxide hydrate green; chromium green (C.I. Pigment Green 48); cobalt green (CI Pigment Green 50); ultramarine green; cobalt blue (C.I. Pigment Blue 28 and 36); ultramarine blue; iron blue (C.I. Pigment Blue 27); manganese blue; ultramarine violet; cobalt and manganese violet; iron oxide red (C.I. Pigment Red 101); cadmium sulfoselenide (C.I. Pigment Red 108); molybdate red (CA. Pigment Red 104); ultramarine red;

Iron oxide brown, mixed brown, spinell and corundum phases (CA. Pigment Brown 24, 29 and 31), chromium orange;

Iron oxide yellow (C.I. Pigment Yellow 42); nickel titanium yellow (C.I. Pigment Yellow 53; C.I. Pigment Yellow 157 and 164); chromium titanium yellow; cadmium sulfide and cadmium zinc sulfide (C.I. Pigment Yellow 37 and 35); chromium yellow (C.I. Pigment Yellow 34), zinc yellow, alkaline earth metal chromates; Naples yellow; bismuth vanadate (C.I. Pigment Yellow 184);

Interference pigments: metallic effect pigments based on coated metal platelets; pearl luster pigments based on metal oxide coated mica platelets; liquid crystal pigments.

Preferred pigments (B) in this context are monoazo pigments (especially laked BONS pigments, Naphthol AS pigments), disazo pigments (especially diary) yellow pigments, bisacetoacetanilide pigments, disazopyrazolone pigments), quinacridone pigments, quinophthalone pigments, perinone pigments, phthalocyanine pigments, triarylcarbonium pigments (alkali blue pigments, laked rhodamines, dye salts with complex anions), isoindoline pigments and carbon blacks.

Examples of particularly preferred pigments (B) are specifically: carbon black, C.I. Pigment Yellow 138, C.I. Pigment Red 122 and 146, C.I. Pigment Violet 19, C.I. Pigment Blue 15:3 and 15:4, C.I. Pigment Black 7, C.I. Pigment Orange 5, 38 and 43 and C.I. Pigment Green 7.

In one embodiment of the present invention, polyurethane (A) has a glass transition temperature, determinable by differential scanning calorimetry (DSC) for example, of not more than 50° C. and preferably of not more than 40° C.

Polyurethanes (A) for the purposes of the present invention are obtainable by reaction of (a) 15% to 70% by weight, preferably 30% to 60% by weight, of di- or polyisocyanate comprising on average from 1 to 10 allophanate groups and on average from 1 to 10 C—C double bonds per molecule, average values each preferably being based on the number average, with (b) nil to 60% by weight, preferably up to 20% by weight, of further di- or polyisocyanate, and (c) 5% to 50% by weight, preferably 30% to 50% by weight, of compound having at least two isocyanate-reactive groups.

At least one di- or polyisocyanate (a) which comprises on average from 1 to 10 and preferably up to 5 allophanate groups and on average per molecule from 1 to 10 and preferably up to 5 C—C double bonds per molecule, average values each being based on the weight average and preferably on the number average, is a compound which is preferably prepared in the presence of a catalyst, from at least one diisocyanate (a1) with at least one compound of the general formula I

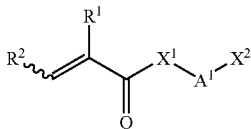

herein also referred to as compound (a2) for short, the variables being defined as follows $R^1$ and $R^2$ are the same or different and are independently selected from hydrogen and $C_1$-$C_{10}$-alkyl, such as for example methyl, ethyl, n-propyl, iso-propyl, n-butyl, isobutyl, sec-butyl, tert-butyl, n-pentyl, isopentyl, sec-pentyl, neo-pentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$-alkyl such as methyl, ethyl, n-propyl, isopropyl, n-butyl, isobutyl, sec-butyl and tert-butyl, in particular methyl;

$X^1$ is selected from oxygen and N—$R^3$, $A^1$ is selected from $C_1$-$C_{20}$-alkylene, preferably $C_2$-$C_{10}$-alkylene, for example —$CH_2$—, —$(CH_2)_{12}$—, —$(CH_2)_{14}$—, —$(CH_2)_{16}$—, —$(CH_2)_{20}$—, preferably —$(CH_2)_2$—, —$(CH_2)_3$—, —$(CH_2)_4$—, —$(CH_2)_5$—, —$(CH_2)_6$—, —$(CH_2)_8$—, —$(CH_2)_{10}$—, unsubstituted or singly or multiply substituted by $C_1$-$C_4$-alkyl, for example methyl, ethyl, n-propyl, isopropyl, n-butyl, isobutyl, sec-butyl or tert-butyl, preferably methyl, phenyl or —O—$C_1$-$C_4$-alkyl, for example O—$CH_3$, —O—$C_2H_5$, —O-n-$C_3H_7$, —O—$CH(CH_3)_2$, —O-n-$C_4H_9$, —O-iso-$C_4H_9$, —O-sec-$C_4H_9$, —O—$C(CH_3)_3$, by way of substituted $C_1$-$C_{20}$-alkylene there may be mentioned for example —CH($CH_3$)—, —CH($C_2H_5$)—, —CH($C_6H_5$)—, —$CH_2$—CH($CH_3$)—, cis- and trans-CH($CH_3$)—CH($CH_3$)—, —$(CH_2)_2$—C($CH_3$)$_2$—$CH_2$—, —$CH_2$—CH($C_2H_5$)—, —$CH_2$—CH(n-$C_3H_7$)—, —$CH_2$—CH(iso-$C_3H_7$)—, wherein substituted or unsubstituted $C_1$-$C_{20}$-alkylene one or more nonadjacent $CH_2$ groups may be replaced by oxygen, examples being —$CH_2$—O—$CH_2$—, —$(CH_2)_2$—O—$(CH_2)_2$—, —[$(CH_2)_2$—O]$_2$—$(CH_2)_2$—, —[$(CH_2)_2$—O]$_3$—$(CH_2)_2$—.

$X^2$ is selected from NH—$R^3$ and preferably oxygen, $R^3$ is in each occurrence different or preferably the same and selected from hydrogen, phenyl and $C_1$-$C_{10}$-alkyl such as for example methyl, ethyl, n-propyl, isopropyl, n-butyl, isobutyl, sec-butyl, tert-butyl, n-pentyl, isopentyl, sec-pentyl, neo-pentyl, 1,2-dimethylpropyl, isoamyl, n-hexyl, isohexyl, sec-hexyl, n-heptyl, n-octyl, 2-ethylhexyl, n-nonyl, n-decyl; more preferably $C_1$-$C_4$-alkyl such as methyl, ethyl, n-propyl, isopropyl, n-butyl, isobutyl, sec-butyl and tert-butyl, in particular methyl.

Very particularly preferred compounds of the general formula I are 2-hydroxyethyl(meth)acrylate and 3-hydroxypropyl(meth)acrylate.

Polyurethane may be prepared in the absence or preferably in the presence of at least one catalyst.

Useful catalysts include for example all catalysts typically used in polyurethane chemistry.

Catalysts typically used in polyurethane chemistry are preferably organic amines, especially tertiary aliphatic, cycloaliphatic or aromatic amines, and Lewis-acidic organic metal compounds.

Useful Lewis-acidic organic metal compounds include for example tin compounds, for example tin(II) salts of organic carboxylic acids, examples being tin(II) acetate, tin(II) octoate, tin(II) ethylhexanoate and tin(II) laurate and the dialkyltin(IV) derivatives of organic carboxylic acids, examples being dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. Metal complexes such as acetyl acetonates of iron, of titanium of zinc, of aluminum, of zirconium, of manganese, of nickel and of cobalt are possible as well. Further useful metal compounds are described by Blank et al. in Progress in Organic Coatings, 1999, 35, 19 ff.

Preferred Lewis-acidic organic metal compounds are dimethyltin diacetate, dibutyltin dibutyrate, dibutyltin bis(2-ethylhexanoate), dibutyltin dilaurate, dioctyltin dilaurate, zirconium acetylacetonate and zirconium 2,2,6,6-tetramethyl-3,5-heptanedionate.

Similarly, bismuth, zinc and cobalt catalysts and also cesium salts can be used as hydrophilic catalysts. Useful cesium salts include those compounds utilizing the following anions: $F^-$, $Cl^-$, $ClO^-$, $ClO_3^-$, $ClO_4^-$, $Br^-$, $J^-$, $JO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)$, $(C_nH_{2n-3}O_2)^-$ and $(C_{n+1}H_{2n-2}O_4)^{2-}$, where n represents integers from 1 to 20.

Preference is given to zinc carboxylates and cesium carboxylates in which the anion conforms to the formulae $(C_nH_{2n-1}O_2)^-$ and also $(C_{n+1}H_{2n-2}O_4)^{2-}$ where n is from 1 to 20. Particularly preferred cesium salts comprise monocarboxylates of the general formula $(C_nH_{2n-1}O_2)^-$, where n represents integers from 1 to 20, as anions. Formate, acetate, propionate, hexanoate, 2-ethylhexanoate, n-octanoate and neodecanoate must be mentioned in particular here.

As customary organic amines there may be mentioned by way of example: triethylamine, 1,4-diazabicyclo[2,2,2]octane, tributylamine, dimethylbenzylamine, N,N,N',N'-tetramethylethylenediamine, N,N,N',N'-tetramethylbutane-1,4-diamine, N,N,N',N'-tetramethylhexane-1,6-diamine, dimethylcyclohexylamine, dimethyldodecylamine, pentamethyldipropylenetriamine, pentamethyldiethylenetriamine, 3-methyl-6-dimethylamino-3-azapentol, dimethylaminopropylamine, 1,3-bisdimethylaminobutane, bis(2-dimethylaminoethyl)ether, N-ethylmorpholine, N-methylmorpholine, N-cyclohexylmorpholine, 2-dimethylaminoethoxyethanol, dimethylethanolamine, tetramethyihexamethylenediamine, dimethylamino-N-methylethanolamine, N-methylimidazole, N-formyl-N,N'-dimethylbutylenediamine, N-dimethylaminoethylmorpholine, 3,3'-bisdimethylamino-di-n-propylamine and/or 2,2'-dipiparazine diisopropyl ether, dimethylpiparazine, tris(N,N-dimethylaminopropyl)-s-hexahydrotriazine, imidazoles such as 1,2-dimethylimidazole, 4-chloro-2,5-dimethyl-1-(N-methylaminoethyl)imidazole, 2-aminopropyl-4,5-dimethoxy-1-methylimidazole, 1-aminopropyl-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole.

Preferred organic amines are trialkylamines having independently two to Ca-alkyl radicals and one alkyl or cycloalkyl radical having 4 to 20 carbon atoms, for example dimethyl-$C_4$-$C_{15}$-alkylamine such as dimethyldodecylamine or dimethyl-$C_3$-$C_8$-cycloalkylamine. Likewise preferred organic amines are bicyclic amines which may if appropriate comprise a further heteroatom such as oxygen or nitrogen such as for example 1,4-diazabicyclo[2,2,2]octane.

It is particularly preferable to use ammonium acetate or triethylamine and most preferable to use N,N,N-trimethyl-N-(2-hydroxypropyl)ammonium 2-ethylhexanoate.

It will be appreciated that mixtures of two or more of the aforementioned compounds may be used as catalysts as well.

Particular preference is given to using such catalysts selected from the aforementioned compounds as are soluble in organic solvents such as acetone, tetrahydrofuran (THF), N-methylpyrrolidone and/or N-ethylpyrrolidone.

Catalyst is preferably used in an amount from 0.0001% to 10% by weight and more preferably in an amount from 0.001% to 5% by weight, based on diisocyanate (a1).

The catalyst or catalysts may be added in solid or liquid form or in solution, depending on the constitution of the catalyst or catalysts. Useful solvents include water-immiscible solvents such as aromatic or aliphatic hydrocarbons such as for example toluene, ethyl acetate, hexane and cyclohexane and also carboxylic esters such as for example ethyl acetate, useful solvents further including acetone, THF and N-methylpyrrolidone and M-ethylpyrrolidone. The catalyst or catalysts is or are preferably added in solid or liquid form and most preferably in solution in organic solvents such as acetone, tetrahydrofuran (THF), N-methylpyrrolidone or N-ethylpyrrolidone.

Diisocyanate (a1) is selected for example from aliphatic, aromatic and cycloaliphatic diisocyanates. Examples of aromatic diisocyanates are 2,4-tolylene diisocyanate (2,4-TDI), 2,4'-diphenylmethane diisocyanate (2,4'-MDI) and so-called TDI mixtures (mixtures of 2,4-tolylene diisocyanate and 2,6-tolylene diisocyanate).

Examples of aliphatic diisocyanates are 1,4-butylene diisocyanate, 1,12-dodecamethylene diisocyanate, 1,10-decamethylene diisocyanate, 2butyl-2-ethylpentamethylene diisocyanate, 2,4,4-trimethylhexamethylene diisocyanate or 2,2,4-trimethylhexamethylene diisocyanate and in particular hexamethylene diisocyanate (HDI).

Examples of cycloaliphatic diisocyanates are isophorone diisocyanate (IPDI), 2-isocyanatopropylcyclohexyl isocyanate, 2,4'-methylenebis(cyclohexyl) diisocyanate and 4-methylcyclohexane 1,3-diisocyanate (H-TDI).

Further examples of isocyanates having groups of differing reactivity are 1,3-phenylene diisocyanate, 1,4-phenylene diisocyanate, 1,5-naphthylene diisocyanate, diphenyl diisocyanate, tolidine diisocyanate and 2,6-tolylene diisocyanate.

Mixtures of the aforementioned diisocyanates can be used, of course.

Diisocyanate (a1) and compound (a2) can be employed in molar ratios of for example from 10:1 to 1:1 and preferably from 5:1 to 5:4.

In one embodiment of the present invention, diisocyanate (a1) and compound (a2) can be reacted with each other at temperatures in the range from 20° C. to 150° C. and preferably from 50 to 130° C.

In one embodiment of the present invention, diisocyanate (a1) and compound (a2) can be in solvent, preferably in an organic solvent or a mixture of organic solvents such as for example toluene, acetone or tetrahydrofuran or mixtures thereof. In another embodiment of the present invention, the reaction of diisocyanate (a1) with compound (a2) is carried out without use of solvent.

In one embodiment of the present invention, the reaction conditions for the reaction of diisocyanate (a1) with compound (a2), for example the molar ratios of diisocyanate (a1) and compound (a2), are chosen such that diisocyanate (a) has 2 isocyanate groups and from 1 to 10 allophanate groups and from 1 to 10 C—C double bonds but no O—CO—NH groups. In another embodiment of the present invention, the reaction conditions for the reaction of diisocyanate (a1) with compound (a2), for example the molar ratios of diisocyanate (a1) and compound (a2), are chosen such that diisocyanate (a) has 2 isocyanate groups and from 1 to 9 allophanate groups and from 1 to 9 C—C double bonds and also one or more O—CO—NH groups.

After the reaction of diisocyanate (a1) with compound (a2) has ended, di- or polyisocyanate (a) can be isolated, for example by removing unconverted starting materials such as diisocyanate (a1) or compound (a2). A suitable method of removing unconverted starting materials such as diisocyanate (a1) and compound (a2) is to distill them out, preferably at reduced pressure. Thin film evaporators are very particularly suitable. Unconverted diisocyanate (a1) is preferably not removed by distillation.

In one embodiment of the present invention, di- or polyisocyanate (a) has a dynamic viscosity at 23° in the range from 500 to 2000 mPa·s, preferably in the range from 600 to 1800 mPa·s and most preferably in the range from 700 to 1500 mPa·s.

In one embodiment of the present invention, di- or polyisocyanate (a) has an NCO content in the range from 8% to 20% by weight and preferably in the range from 12% to 17% by weight, determinable by titration for example.

Polyurethane (A) is prepared by reacting di- or polyisocyanate (a) with at least one furthey di- or polyisocyanate (b). Di- or polyisocyanate (b) can be selected from the above-mentioned aliphatic, aromatic and cycloaliphatic diisocyanates.

In one embodiment of the present invention, di- or polyisocyanate (b) is chosen so that it is other than diisocyanate (a1).

In one embodiment of the present invention, di- or polyisocyanate (b) is chosen so that it is like diisocyanate (a1). One specific embodiment of the present invention comprises selecting di- or polyisocyanate (b) to be like diisocyanate (a1) by not separating from unconsumed diisocyanate (a1) after the preparation of di- or polyisocyanate (a) has ended.

Polyurethane (A) is further prepared by reacting with at least one compound having at least two isocyanate-reactive groups (c) which is also referred to as compound (c) in the realm of the present invention. Particularly readily isocyanate-reactive groups include for example the SH group, the hydroxyl group, the $NH_2$ group and the $NHR^3$ group, in which $R^3$ is as defined above.

Compound (c) may be hydrophilic or hydrophobic.

At least one compound (c) is preferably selected from 1,1,1-trimethylol-$C_1$-$C_4$-alkylcarboxylic acids, for example 1,1,1-trimethylol acetic acid, 1,1,1-trimethylolpropanoic acid, 1,1,1-trimethylolbutyric acid, citric acid, 1,1-dimethylol-$C_1$-$C_4$-alkylcarboxylic acids, for example 1,1-dimethylolacetic acid, 1,1-dimethylolpropanoic acid, 1,1-dimethylolbutyric acid, 1,1-dimethylol-$C_1$-$C_4$-alkylsulfonic acids, poly-$C_2$-$C_3$-alkylene glycols having on average from 3 to 300 alkylene oxide units per molecule, in particular polyethylene glycol having on average (number average) from 3 to 300 ethylene oxide units per molecule and polyaddition products of ethylene oxide and propylene oxide having on average (number average) from 3 to 300 ethylene oxide units per molecule and a molar fraction of ethylene oxide higher than the fraction of propylene oxide;

hydrophilic diamines having COOM or SO₃M groups, for example

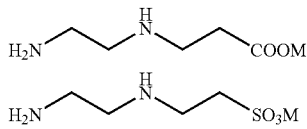

Where each M is selected from alkali metal ions, in particular Na⁺, and ammonium ions,
polyesterdiols preparable by polycondensation of
at least one aliphatic or cycloaliphatic diol, preferably ethylene glycol, 1,4-butanediol, 1,6-hexanediol, cis-1,4-cyclohexanediol, trans-1,4-cyclohexanediol, cis- and trans-1,4-dihydroxymethylcyclohexane (cyclohexanedimethanol),
with at least one aliphatic, aromatic or cycloaliphatic dicarboxylic acid, examples being succinic acid, glutaric acid, adipic acid, cyclohexane-1,4-dicarboxylic acid, terephthalic acid, isophthalic acid.

One embodiment of the present invention comprises selecting at least two dicarboxylic acids for preparing polyesterdiol of which one is aromatic and the other is aliphatic, examples being succinic acid and isophthalic acid, glutaric acid and isophthalic acid, adipic acid and isophthalic acid, succinic acid and terephthalic acid, glutaric acid and terephthalic acid, adipic acid and terephthalic acid.

To prepare polyesterdiol using two or more dicarboxylic acids, any desired molar ratios can be used. When an aromatic dicarboxylic acid and an aliphatic dicarboxylic acid are to be used, a molar ratio in the range from 10:1 to 1:10 is preferred, a molar ratio in the range from 1.5:1 to 1:1.5 is peculiar.

In one embodiment of the present invention, polyesterdiols used as compound (c) have a hydroxyl number in the range from 20 to 200 mg KOH/g, preferably in the range from 50 to 180 and most preferably in the range from 100 to 160 mg KOH/g, determined according to German standard specification DIN 53240.

In one embodiment of the present invention, polyesterdiols used as compound (c) have a molecular weight $M_w$ in the range from 500 to 100 000 g/mol, preferably in the range from 700 to 50 000 g/mol and more preferably up to 30 000 g/mol.

Further suitable compounds (c) are ethanolamine, diethanolamine, neopentylglycol, 1,4-butanediol, 1,6-hexanediol, 1,1-dimethylolpropane.

One embodiment of the present invention comprises reacting with at least two compounds (c) of which one is selected from ethanolamine, diethanolamine, neopentylglycol, 1,4-butanediol, 1,6-hexanediol, 1,1-dimethylolpropane.

One embodiment of the present invention comprises synthesizing polyurethane (A) by (d) further adding at least one compound of the general formula I in the reaction of di- or polyisocyanate (a), and further di- or polyisocyanate (b), if present, with compound (c).

Compounds of the formula I are described above.

As compound (d) of the general formula I there may be used a compound of the general formula I other than for preparing di- or polyisocyanate (a) which on average comprises from 1 to 10 allophanate groups and on average from 1 to 10 C—C double bonds per molecule. Preferably, however, compound (d) and compound (a2) are identical.

The synthesis of polyurethane (A) can be carried out by conventional methods of polyurethane chemistry.

Aqueous dispersions of the present invention further comprise at least one polymerization inhibitor (C), also referred to as inhibitor (C) or stabilizer (C). Polymerization inhibitors (C) can be selected from UV absorbers and free-radical scavengers. UV absorbers convert UV radiation into thermal energy. Suitable UV absorbers include for example oxanilides, triazines and benzotriazole (the latter obtainable as Tinuvin® products from Ciba-Spezialitatenchemie), benzophenones, hydroxybenzophenones, hydroquinone, hydroquinone monoalkyl ethers such as for example hydroquinone monomethyl ether (MEHQ). Free-radical scavengers bind free-radicals formed as intermediates. Suitable free-radical scavengers include for example sterically hindered amines known as Hindered Amine Light Stabilizers (HALSs). Examples thereof are 2,2,6,6-tetramethylpiperidine, 2,6-ditert-butylpiperidine or derivatives thereof, for example bis(2,2,6,6-tetramethyl-4-piperidyl) sebacate. Further useful polymerization inhibitors (C) are substituted phenols, particularly tert-alkyl-substituted phenols such as for example

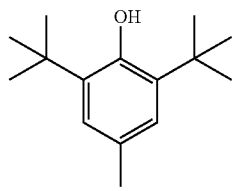

(C.1)

One embodiment of the present invention utilizes a mixture of two or more polymerization inhibitors (C), for example a hydroquinone ether and a substituted phenol.

For example, altogether up to 15% by weight, based on the sum total of (A) and (B), of polymerization inhibitor (C) can be added, more preferably from 0.1 to 1% by weight.

Polymerization inhibitor (C) can be added during the synthesis of polyurethane (A) or subsequently, for example in the course of the dispersing of pigment (B).

One embodiment of the present invention may utilize di- or polyisocyanate (a), further di- or polyisocyanate (b) and compound (c) and optionally further compound of the general formula I (d) in the following weight ratios, each based on total polyurethane (A):
15% to 70% by weight, preferably 30% to 60% by weight, of di- or polyisocyanate (a), nil to 60% by weight, preferably to 20% by weight, of further di- or polyisocyanate (b), 5% to 50% by weight, preferably 30% to 50% by weight, of compound (c), nil to 20% by weight, preferably to 10% by weight, of compound of the general formula I (d).

Each weight % age is based on total polyurethane (A).

One preferred version of the present invention comprises preparing polyisocyanate (A) by reacting not only di- or polyisocyanate (a), further di- or polyisocyanate (b) and compound (c) and if appropriate further compound of the general formula I (d) but additionally with at least one nucleophilic alcohol or amine, preferably monoalcohol or monoamine, which in either case may serve as a stopper and hereinafter is designated stopper (e). Examples of suitable stoppers (e) are mono- and di-$C_1$-$C_4$-alkylamines, in particular diethylamine and N,N-diethanolamine. Up to 10% by weight of stopper (e) can be used, based on polyurethane (A) to be synthesized.

The preparation of polyurethane (A) from di- or polyisocyanate (a), further di- or polyisocyanate (b), compound (c) and if appropriate further compound of the general formula I (d) and if appropriate stopper (e) can be carried out in one or more stages. For example, di- or polyisocyanate (a), further di- or polyisocyanate (b) and compound (c) can be reacted in a first stage, preferably in the presence of a catalyst, the reaction stopped and thereafter again di- or polyisocyanate (b) and compound of the general formula I (d) and if appropriate stopper (e) added. It is also possible for example to react di- or polyisocyanate (a), further di- or polyisocyanate (b) and compound (c) with one another using an excess of further di- or polyisocyanate (b), and to stop the reaction by adding stopper (e).

In one embodiment of the present invention, di- or polyisocyanate (a), further di- or polyisocyanate (b), compound (c) and if appropriate further compound of the general formula I (d) and if appropriate stopper (e) can be reacted in a solvent, preferably in an organic solvent or a mixture of organic solvents such as for example toluene, acetone or tetrahydrofuran or mixtures thereof. In another embodiment of the present invention the reaction of di- or polyisocyanate (a), further di- or polyisocyanate (b), compound (c) and if appropriate further compound of the general formula I (d) and if appropriate stopper (e) is carried out without use of solvent.

One embodiment of the present invention comprises reacting di- or polyisocyanate (a), further di- or polyisocyanate (b) and compound (c) and if appropriate further compound of the general formula I (d) and if appropriate stopper (e) with one another at temperatures in the range from 20° C. to 150° C. and preferably in the range from 20 to 80° C.

To speed up the reaction of di- or polyisocyanate (a), further di- or polyisocyanate (b), compound (c) and if appropriate further compound of the general formula I (d) and if appropriate stopper (e), one or more catalysts can be used which is or are advantageously chosen from the aforementioned catalysts.

After the reaction of di- or polyisocyanate (a), further di- or polyisocyanate (b), compound (c) and if appropriate further compound of the general formula I (d) and if appropriate stopper (e) has ended, polyurethane (A) can be isolated, for example by removing unconverted starting materials such as di- or polyisocyanate (b), compound (c) and if appropriate further compound of the general formula I (d) and if appropriate stopper (e). A suitable method of removing unconverted starting materials such as (b) and (c) and if appropriate (d) and (e) is to distill them out, preferably at reduced pressure. Thin film evaporators are very particularly suitable. Preferably, unconverted di- or polyisocyanate (b) is not distilled out.

The molecular weight $M_w$ of the polyurethanes (A) can be for example in the range from 500 to not more than 50 000 g/mol, preferably in the range from 1000 to 30 000 g/mol, more preferably in the range from 2000 to 25 000 g/mol and most preferably at least 2000 g/mol, determined by gel permeation chromatography (GPC) for example.

In a preferred embodiment of the present invention, polyurethane (A) comprises no free NCO groups.

After the reaction of di- or polyisocyanate (a), further di- or polyisocyanate (b) and compound (c) and if appropriate (d) and if appropriate stopper (e) has taken place, water can be added, for example in a weight ratio of polyurethane (A) to water in the range from 1:1 to 1:10.

After the reaction of di- or polyisocyanate (a), further di- or polyisocyanate (b) and compound (c) and if appropriate (d) and stopper (e) has taken place, groups comprising sufficiently acidic hydrogen atoms can be treated with bases to convert them into the corresponding salts. Useful bases include for example hydroxides and bicarbonates of alkali metals or alkaline earth metals or the carbonates of alkali metals. Useful bases further include volatile amines, i.e., amines having a boiling point of up to 180° C. atmospheric pressure, examples being ammonia, methylamine, dimethylamine, trimethylamine, ethylamine, diethylamine, triethylamine, ethanolamine, N-methyldiethanolamine or triethanolamine. Similarly, basic groups can be converted with acids such as for example α-hydroxy carboxylic acids or α-amino acids or else α-hydroxy sulfonic acids into the corresponding salts.

After the reaction of di- or polyisocyanate (a), further di- or polyisocyanate (b) and compound (c) if appropriate (d) and stopper (e) has taken place, any organic solvent used can be separated off, for example by distillation.

After polyurethane (A) has been prepared, one or more pigments (B) and if appropriate water are added. It is preferable to set a solids content in the range from to 3% to 40%, preferably to 35% and more preferably in the range from 5% to 30%.

The weight ratio of polyurethane (A) to pigment (B) can vary within wide limits. In one embodiment of the present invention, the weight ratio of polyurethane (A) to pigment (B) is in a range from 5:1 to 1:3, preferably from 3:1 to 1:2 and more preferably from 2:1 to 2:3.

Polyurethane (A) and pigment (B) are subsequently dispersed. The dispersing can be effected in any apparatus suitable for dispersing. Shaking apparatuses such as for example from Skandex may be mentioned by way of example. Preferably, polyurethane (A) and pigment (B) are dispersed for example in ultrasonic apparatuses, high pressure homogenizers, 2-, 3-, 4- or 5-roll mills, minimills, Henschel mixers, shaking mills, Ang mills, gear mills, bead mills, wet mills, sand mills, attritors, colloid mills, ultrasonic homogenizers, with Ultra Turrax stirrer and in particular by grinding, for example in 2-, 3-, 4- or 5-roll mills, minimills, shaking mills, Ang mills, gear mills, bead mills, wet mills, sand mills, colloid mills, ball mills, specifically stirred ball mills.

The dispersing time is suitably in the range from 10 minutes to 48 hours for example, although a longer time is conceivable as well. Preference is given to a dispersing time in the range from 15 minutes to 24 hours.

Pressure and temperature conditions during the dispersing are generally not critical in that for example atmospheric pressure has been found to be suitable. As temperatures, for example temperatures in the range from 10° C. to 100° C. have been found to be suitable, preferably up to 80° C.

The dispersing provides aqueous dispersion according to the present invention. In one embodiment of the present invention, aqueous dispersions according to the present invention have a solids content in the range from 3% to 40%, preferably up to 35% and more preferably in the range from 5% to 30%.

Customary grinding aids can be added during the dispersing.

The average diameter of pigment (B) at least partially enveloped by polyurethane (A) is typically in the range from 20 nm to 1.5 μm, preferably in the range from 60 to 500 nm and more preferably in the range from 60 to 350 nm after the dispersing and in connection with the present invention generally signifies the volume average. Useful measuring appliances for determining the average particle diameter include for example Coulter Counters, for example Coulter LS 230.

When it is desired to use carbon black according to the present invention as pigment (B), the particle diameter is based on the average diameter of the primary particles.

Aqueous dispersions according to the present invention comprise no thermal initiator, i.e., no compound which has a half-fife of at least one hour at 60° C. and splits into free radicals in the process, examples being peroxides, hydroperoxides, hydrogen peroxide, persulfates, azo compounds such as for example azobisisobutyronitrile (AIBN) or water-soluble AIBN derivatives, highly substituted, in particular hexasubstituted, ethane derivatives or redox catalysts.

In one embodiment of the present invention, aqueous dispersions according to the present invention comprise at least one polyurethane (D). Polyurethane (D) is obtainable for example by reaction of di- or polyisocyanate (b) with compound (c), but preferably comprises no allophanate groups. Particularly preferably pigment (B) is at least partially enveloped not just by polyurethane (A) but also by polyurethane (D).

In one embodiment of the present invention, aqueous dispersions according to the present invention comprise polyurethane (A) and polyurethane (D) in the range from 10:1 to 1:2 and preferably in the range from 8:1 to 1:1 (weight ratio).

In one embodiment of the present invention, aqueous dispersions according to the present invention comprise at least one photoinitiator (E). Photoinitiator (E) can be added either before the dispersing or alternatively after the dispersing.

Suitable photoinitiators (E) include for example photoinitiators known to one skilled in the art, examples being those mentioned in "Advances in Polymer Science", Volume 14, Springer Berlin 1974 or in K.K. Dietliker, Chemistry and Technology of UV- and EB-Formulation for Coatings, Inks and Paints, Volume 3; Photoinitiators for Free Radical and Cationic Polymerization, P. K. T. Oldring (Eds), SITA Technology Ltd, London.

Useful photoinitiators include for example mono- or bisacylphosphine oxides as described for example in EP-A 0 007 508, EP-A 0 057 474, DE-A 196 18 720, EP-A 0 495 751 and EP-A 0 615 980, examples being 2,4,6-trimethylbenzoyldiphenylphosphine oxide, ethyl 2,4,6-trimethylbenzoylphenylphosphinate, bis(2,4,6-trimethylbenzoyl)phenylphosphine oxide, benzophenone, hydroxyacetophenone, phenylglyoxylic acid and derivatives thereof or mixtures of the aforementioned photoinitiators. As examples there may be mentioned benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-di-iso-propylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7-H-benzoin methyl ether, benz[de]anthracen-7-one, 1-naphthaldehyde, 4,4'-bis(dimethylamino) benzophenone, 4-phenylbenzophenone, 4-chlorobenzophenone, Michler's ketone, 1-acetonaphthone, 2-acetonaphthone, 1-benzoylcyclohexan-1-ol, 2-hydroxy-2,2-dimethylacetophenone, 2,2-dimethoxy-2-phenylacetophenone, 2,2-diethoxy-2-phenylacetophenone, 1,1-dichloroacetophenone, 1-hydroxyacetophenone, acetophenone dimethyl ketal, o-methoxybenzophenone, triphenylphosphine, tri-o-tolylphosphine, benz[α]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tertbutylanthraquinone, 1-chloroanthraquinone, 2-amylanthraquinone and 2,3-butanedione.

Also suitable are nonyellowing or minimally yellowing photoinitiators of the phenylglyoxalic ester type, as described in DE-A 198 26 712, DE-A 199 13 353 or WO 98/33761.

Preferred photoinitiators (E) include for example photoinitiators which split upon activation, so-called α-splitters such as for example photoinitiators of the benzil dialkyl ketal type such as for example benzil dimethyl ketal. Further examples of useful α-splitters are derivatives of benzoin, isobutyl benzoin ether, phosphine oxides, especially mono- and bisacylphosphine oxides, for example benzoyldiphenylphosphine oxide, 2,4,6-trimethylbenzoyldiphenylphosphine oxide, α-hydroxyalkylacetophenones such as for example 2-hydroxy-2-methylphenylpropanone (E.1),

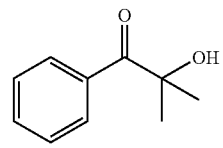

(E.1)

2-hydroxy-[4-(2-hydroxyethoxy)phenyl]-2-methyl-1-propanone (E.2)

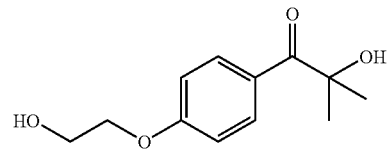

(E.2)

phosphine sulfides and ethyl 4-dimethylaminobenzoate and also (E.3)

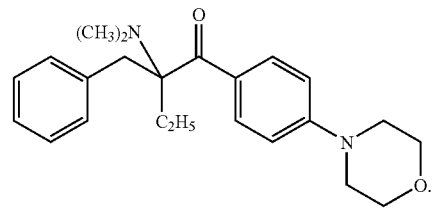

(E.3)

Preferred photoinitiators (E) further include for example hydrogen-abstracting photoinitiators, for example of the type of the substituted or unsubstituted acetophenones, anthraquinones, thioxanthones, benzoic esters or of the substituted or unsubstituted benzophenones. Particularly preferred examples are isopropylthioxanthone, benzophenone, phenyl benzyl ketone, 4-methylbenzophenone, halomethylated benzophenones, anthrone, Michler's ketone (4,4'-bis-N, N-dimethylaminobenzophenone), 4-chlorobenzophenone, 4,4'-dichlorobenzophenone, anthraquinone.

In one embodiment of the present invention, sufficient photoinitiator (E) is added to aqueous dispersions according to the present invention that the weight ratio of polyurethane (A) to photoinitiator (E) is in a range from 3:1 to 10 000:1, preferably from 5:1 to 5000:1 and most preferably in a weight ratio from 10:1 to 1000:1.

The efficacy of photoinitiators (E) in aqueous dispersions according to the present invention can if desired be enhanced by the addition of at least one synergist, for example of at least one amine, especially of at least one tertiary amine. Useful amines include for example triethylamine, N,N-dimethylethanolamine, N-methylethanolamine, triethanolamine, amino acrylates such as for example amine-modified polyether acrylates. When amines such as for example tertiary amines have been used as a catalyst in the synthesis of polyurethane (A) and have not been removed after synthesis, it is also possible for tertiary amine used as a catalyst to act as a synergist. Furthermore, tertiary amine used to neutralize acidic groups such as for example COOH groups or $SO_3H$ groups can act as a synergist. Up to twice the molar amount of synergist can be added, based on photoinitiator (E) used.

Dispersions according to the present invention may be additized with one or more further compounds having C=C double bonds (F), hereinafter also referred to as unsaturated compounds (F). Particularly suitable unsaturated compounds (F) include for example compounds of the general formula I. Further particularly suitable unsaturated compounds (F) are those of the general formula F.1

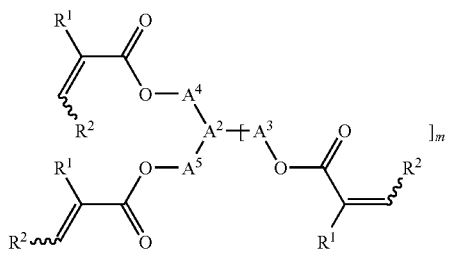

where $R^1$ and $R^2$ are the same or different and are independently selected from hydrogen and $C_1$-$C_{10}$-alkyl, m is an integer from 0 to 2 and preferably 1;

$A^2$ is $CH_2$ or $CH_2$—$CH_2$— or $R^8$—CH or para-$C_6H_4$ when m=0,

CH, C—OH, C—O—C(O)—CH=$CH_2$, C—O—CO—C($CH_3$)=$CH_2$, $R^8$—C or 1,3,5-$C6H_3$ when m=1, and carbon when m=2;

$R^8$ is selected from $C_1$-$C_4$-alkyl, such as for example n-$C_4H_9$, n-$C_3H_7$, iso-$C_3H_7$ and preferably $C_2H_5$ and $CH_3$, or phenyl, $A^3$, $A^4$ and $A^5$ are the same or different and are each selected from $C_1$-$C_{20}$-alkylene, such as for example —$CH_2$—, —CH($CH_3$)—, —CH($C_2H_5$)—, —CH($C_6H_5$)—, —($CH_2$)$_2$—, —($CH_2$)$_3$—, —($CH_2$)$_4$—, —($CH_2$)$_5$—, —($CH_2$)$_6$—, —($CH_2$)$_7$—, —($CH_2$)$_8$—, —($CH_2$)$_9$—, —($CH_2$)$_{1-0}$—, —CH($CH_3$)—($CH_2$)$_2$—CH($CH_3$)—;

cis- or trans-$C_4$-$C_{10}$-cycloalkylene, such as for example cis-1,3-cyclopentylidene, trans-1,3-cyclopentylidene cis-1,4-cyclohexylidene, trans-1,4-cyclohexylidene;

$C_1$-$C_{20}$-alkylene, in each of which from one up to seven carbon atoms which are each nonadjacent are replaced by oxygen, such as for example —$CH_2$—O—$CH_2$—, —($CH_2$)$_2$—O—$CH_2$—, —($CH_2$)$_2$—O—($CH_2$)$_2$—, —[($CH_2$)$_2$—O]$_2$—($CH_2$)$_2$—, —[($CH_2$)$_2$—O]$_3$—($CH_2$)$_2$—;

$C_1$-$C_{20}$-alkylene which is substituted by up to 4 hydroxyl groups, and in which from one up to seven carbon atoms which are each nonadjacent are replaced by oxygen, such as for example —$CH_2$—O—$CH_2$—CH(OH)—$CH_2$—, —$CH_2$—O—[$CH_2$—CH(OH)—$CH_2$]$_2$—, —$CH_2$—O—[$CH_2$—CH(OH)—$CH_2$]$_3$—;

$C_6$-$C_{14}$-arylene, such as for example para-$C_6H_4$.

Particularly preferred examples of compounds of the general formula F.I are trimethylolpropane tri(meth)acrylate, tri(meth)acrylate of triply ethoxylated trimethylolpropane, pentaerythritol tri(meth)acrylate and pentaerythritol tetra(meth)acrylate.

Further very useful representatives of unsaturated compounds (F) are ethylene glycol di(meth)acrylate, diethylene glycol di(meth)acrylate, triethylene glycol di(meth)acrylate, propylene glycol (meth)acrylate, dipropylene glycol di(meth)acrylate and tripropylene glycol di(meth)acrylate.

Further very useful representatives of unsaturated compounds (F) are partially or exhaustively (meth)acrylated polyols such as for example partially or exhaustively (meth)acrylated dimeric trimethylolpropane, partially or exhaustively (meth)acrylated dimeric trimethylolethane, partially or exhaustively (meth)acrylated dimeric pentaerythritol.

For example, a total of up to 100% by weight, based on the sum total of (A) and (B), of unsaturated compound (F) can be added, preferably up to 50% by weight and more preferably up to 25% by weight.

Aqueous dispersions according to the present invention are very useful as or for producing formulations for dyeing or printing substrates, for example for producing dyeing liquors for pigment dyeing or for producing print pastes for pigment printing. The present invention therefore further provides for the use of aqueous dispersions according to the present invention as or for producing formulations for dyeing or printing substrates. The present invention similarly provides a process for dyeing or printing substrates by utilizing at least one aqueous dispersion according to the present invention.

Useful substrate materials include:

cellulosic materials such as paper, board, card, wood and woodbase, which may each be lacquered or otherwise coated, metallic materials such as foils, sheets or workpieces composed of aluminum, iron, copper, silver, gold, zinc or alloys thereof, which may each be lacquered or otherwise coated, silicatic materials such as glass, porcelain and ceramic, which may each be coated, polymeric materials of any kind such as polystyrene, polyamides, polyesters, polyethylene, polypropylene, melamine resins, polyacrylates, polyacrylonitrile, polyurethanes, polycarbonates, polyvinyl chloride, polyvinyl alcohols, polyvinyl acetates, polyvinylpyrrolidones and corresponding copolymers including block copolymers, biodegradable polymers and natural polymers such as gelatin, comestibles and parts of comestibles in particular eggshells, leather—both natural and artificial—in the form of smooth leather, nappa leather or suede leather, comestibles and cosmetics, and in particular textile substrates such as fibers, yarns, threads, knits, wovens, nonwovens and garments composed of polyester, modified polyester, polyester blend fabric, cellulosic materials such as cotton, cotton blend fabric, jute, flax, hemp and ramie, viscose, wool, silk, polyamide, polyamide blend fabric, polyacrylonitrile, triacetate, acetate, polycarbonate, polypropylene, polyvinyl chloride, blend fabric such as for example polyesterpolyurethane blend fabric (e.g. Lycra®), polyethylene-polypropylene blend fabric, polyester microfibers and glass fiber fabric.

Aqueous dispersions according to the present invention are particularly useful as or for producing inks for the ink jet process, in particular aqueous inks for the ink jet process. Aqueous dispersions according to the present invention are very particularly useful for producing pigment-containing aqueous inks for the ink jet process. The present invention thus further provides for the use of aqueous dispersions according to the present invention for producing inks for the ink jet process. The present invention further provides a process for producing inks for the ink jet process, which comprises utilizing at least one aqueous dispersion according to the present invention.

In the realm of the present invention, inks for the ink jet process will also be referred to as ink jet inks or in short as inks.

In one embodiment of the present invention, ink jet inks according to the present invention comprise from 1% to 40% by weight and preferably from 2% to 35% by weight of aqueous dispersion according to the present invention, the weight % ages each being based on the total weight of the relevant ink according to the present invention.

Aqueous dispersions according to the present invention can be used directly as ink jet inks.

Ink jet inks according to the present invention may comprise at least one admixture (G) in another embodiment.

In one embodiment of the present invention, ink jet inks according to the present invention are produced by thinning aqueous dispersion according to the present invention with water and if appropriate mixing it with one or more admixtures (G).

In one embodiment of the present invention, ink jet inks according to the present invention are set to a solids content in the range from 5% to 40%, preferably up to 35% and more preferably in the range from 10% to 30%.

Ink jet process inks according to the present invention may comprise one or more organic solvents as admixture (G). Low molecular weight polyethylene glycols are preferred admixtures (G), they can be used preferably in a mixture with one or more high-boiling, water-soluble or water-miscible organic solvents.

The average molecular weight $M_n$ of preferred low molecular weight polyethylene glycols is typically in the range from 100 to 6000 g/mol, particularly to 1500 g/mol, and especially in the range from 150 to 500 g/mol. As examples there may be mentioned diethylene glycol, triethylene glycol and tetraethylene glycol, diethylene glycol monomethyl ether, diethylene glycol monoethyl ether, diethylene glycol mono-n-propyl ether, diethylene glycol monoisopropyl ether, diethylene glycol monopropyl ether, diethylene glycol mono-n-butyl ether, triethylene glycol monomethyl ether, triethylene glycol monoethyl ether, triethylene glycol mono-n-propyl ether, triethylene glycol monoisopropyl ether and triethylene glycol mono-n-butyl ether.

When low molecular weight polyethylene glycols are used in a mixture with further organic solvents as an admixture (G), the further organic solvents employed will generally be high-boiling (i.e., boiling point >100° C. at atmospheric pressure, in general) and hence water-retaining organic solvents which are soluble in or miscible with water.

Useful solvents include polyhydric alcohols, preferably unbranched and branched polyhydric alcohols having from 2 to 8 and especially from 3 to 6 carbon atoms, such as ethylene glycol, 1,2-propylene glycol, 1,3-propylene glycol, glycerol, erythritol, pentaerythritol, pentitols such as arabitol, adonitol and xylitol and hexitols such as sorbitol, mannitol and dulcitol.

Useful solvents further include polypropylene glycols including their lower polymers (di-, tri- and tetramers) and their mono(especially $C_1$-$C_6$ and especially $C_1$-$C_4$)alkyl ethers. Preference is given to polypropylene glycols having average molecular weights $M_n$ in the range from 100 to 6000 g/mol, especially to 1500 g/mol and in particular in the range from 150 to 500 g/mol. As examples there may be mentioned di-, tri- and tetra-1,2- and -1,3-propylene glycol and di-, tri- and tetra-1,2- and -1,3-propylene glycol monomethyl, monoethyl, mono-n-propyl, monoisopropyl and mono-n-butyl ethers.

Low molecular weight polytetrahydrofuran is also useful as a solvent. The average molecular weight $M_w$ of preferred low molecular weight polytetrahydrofuran is typically in the range from 150 to 500 g/mol, preferably in the range from 200 to 300 g/mol and more preferably about 250 g/mol (in keeping with a molecular weight distribution).

Low molecular weight polytetrahydrofuran is preparable in a known manner by cationic polymerization of tetrahydrofuran. The products are linear polytetramethylene glycols.

Useful solvents further include pyrrolidone and N-alkylpyrrolidones whose alkyl chain preferably comprises from 1 to 4 and in particular 1 or 2 carbon atoms. Examples of useful alkylpyrrolidones are N-methylpyrrolidone, N-ethylpyrrolidone and N-(2-hydroxyethyl)pyrrolidone.

Examples of particularly preferred solvents are 1,2-propylene glycol, 1,3-propylene glycol, glycerol, sorbitol, diethylene glycol, polyethylene glycol ($M_w$ 300 to 500 g/mol), diethylene glycol monobutyl ether, triethylene glycol monobutyl ether, pyrrolidone, N-methylpyrrolidone and N-(2-hydroxyethyl)pyrrolidone.

Low molecular weight polyethylene glycol can also be mixed with one or more (for example two, three or four) of the solvents recited above.

In one embodiment of the present invention, ink jet process inks according to the present invention may comprise from 0.1% to 80% by weight, preferably from 2% to 60% by weight, more preferably from 5% to 50% by weight and most preferably from 10% to 40% by weight of nonaqueous solvents.

Nonaqueous solvents used as admixtures (G), including in particular the recited particularly preferred solvent combinations, may advantageously be supplemented with urea (generally in the range from 0.5% to 3% by weight, based on the weight of the colorant preparation) to further enhance the water-retaining effect of the solvent mixture.

Ink jet process inks according to the present invention may comprise further admixtures (G) of the kind which are customary especially for aqueous ink jet inks and in the printing and coatings industries. Examples include preservatives such as for example 1,2-benzisothiazolin-3-one (commercially available as Proxel brands from Avecia Lim.) and its alkali metal salts, glutaraldehyde and/or tetramethylolacetylenediurea, Protectols®, antioxidants, degassers/defoamers such as for example acetylenediols and ethoxylated acetylenediols, which typically comprise from 20 to 40 mol of ethylene oxide per mole of acetylenediol and may at the same time also have a dispersing effect, viscosity regulators, flow agents, wetters (for example wetting surfactants based on ethoxylated or propoxylated fatty or oxo alcohols, propylene oxide-ethylene oxide block copolymers, ethoxylates of oleic acid or alkylphenols, alkylphenol ether sulfates, alkylpolyglycosides, alkyl phosphonates, alkylphenyl phosphonates, alkyl phosphates, alkylphenyl phosphates or preferably polyethersiloxane copolymers, especially alkoxylated 2-(3-hydroxypropyl) heptamethyltrisiloxanes, which generally comprise a block of 7 to 20 and preferably 7 to 12 ethylene oxide units and a block of 2 to 20 and preferably 2 to 10 propylene oxide units and may be comprised in the colorant preparations in amounts from 0.05% to 1% by weight), anti-settlers, luster improvers, glidants, adhesion improvers, anti-skinning agents, delusterants, emulsifiers, stabilizers, hydrophobicizers, light control additives, hand improvers, antistats, bases such as for example triethanolamine or acids, specifically carboxylic acids such as for example lactic acid or citric acid to regulate the pH. When these agents are a constituent part of ink jet process inks according to the present invention, their total amount will generally be 2% by weight and especially 1% by weight, based on the weight of the present invention's colorant preparations and especially of the present invention's inks for the ink jet process.

Useful admixtures (G) further include alkoxylated or non-alkoxylated acetylenediols, for example of the general formula II

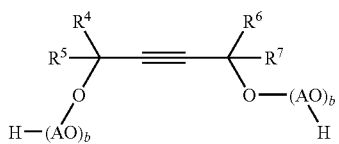

where
AO represents identical or different alkylene oxide units, for example propylene oxide units, butylene oxide units and especially ethylene oxide units,
$R^4$, $R^5$, $R^6$ and $R^7$ are each the same or different and selected from $C_1$-$C_{10}$-alkyl, branched or unbranched, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, n-octyl, 2-ethylhexyl, n-nonyl, n-decyl, more preferably $C_1$-$C_4$-alkyl such as methyl, ethyl, n-propyl, isopropyl, n-butyl, isobutyl, sec-butyl and tert-butyl; and hydrogen;
b is in each occurrence the same or different and selected from integers in the range from 0 to 50, preferably 0 or 1 to 30 and more preferably 3 to 20.

In a preferred embodiment of the present invention, $R^5$ or $R^7$ are methyl.

In a preferred embodiment of the present invention, $R^5$ and $R^7$ are methyl and $R^4$ and $R^6$ are isobutyl.

Other preferred admixtures are alkoxylated or nonalkoxylated silicon compounds of the formula III

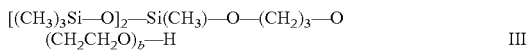

where b is as defined above.

Ink jet process inks according to the present invention may further comprise a further photoinitiator other than the photoinitiator (E) which can be used in the preparation of aqueous dispersion according to the present invention, but is selected from the photoinitiators recited above.

Ink jet process inks according to the present invention in one embodiment of the present invention have a dynamic viscosity in the range from 2 to 80 mPa·s, preferably from 3 to 40 mPa·s, and more preferably up to 25 mPa·s, measured at 23° C. in accordance with German standard specification DIN 53018.

The surface tension of ink jet process inks according to the present invention in one embodiment of the present invention is in the range from 24 to 70 mN/m and especially in the range from 25 to 60 mN/m, measured at 25° C. in accordance with German standard specification DIN 53993.

The pH of ink jet process inks according to the present invention in one embodiment of the present invention is in the range from 5 to 10 and preferably in the range from 8 to 10.

Ink jet process inks according to the present invention have altogether advantageous performance characteristics, in particular good start-of-print performance and good sustained use performance (kogation) and also, especially when the particularly preferred solvent combination is used, good drying performance, and produce printed images of high quality, i.e., of high brilliance and depth of shade and also high dry rub, light, water and wet rub fastness. They are particularly useful for printing coated and plain paper and also textile substrates.

A further aspect of the present invention is a process for producing ink jet process inks according to the present invention. The present invention's process for producing inks for the ink jet process comprises mixing at least one aqueous dispersion according to the present invention, water and if appropriate at least one admixture (G) with one another, for example in one or more steps.

Useful mixing techniques include for example stirring and intensive shaking and also dispersing, for example in ball mills or stirred ball mills.

The order of addition when mixing aqueous dispersion according to the present invention, water, if appropriate (C), if appropriate (D), if appropriate (E), if appropriate (F) and if appropriate (G) is as such not critical.

It is accordingly possible, in one version of the present invention, first for at least one polyurethane (A) to be synthesized, then dispersed with pigment (B) and thereafter mixed with one or more of the desired additives (C), (D), (E), (F) and/or (G) and, before or after the mixing, thinned with water.

In another version of the present invention, (a) at least one polyurethane (A) and at least one polyurethane (D) are synthesized, then mixed with polymerization inhibitor (C) and dispersed with (B), thinned with water and mixed if appropriate with one or more of the desired additives (E), (F) and/or (G).

In another version of the present invention, at least one polyurethane (A) is synthesized in the presence of polymerization inhibitor (C) and then dispersed with pigment (B) and at least one of the desired additives (D) (E), (F) and (G).

In another version of the present invention, at least one polyurethane and also polyurethane (A) and at least one polyurethane (D) are synthesized in the presence of polymerization inhibitor (C) and then dispersed with pigment (B) and at least one of the desired additives (E), (F) and (G).

A further aspect of the present invention is a process for printing sheetlike or three-dimensional substrates by the ink jet process using at least one ink jet process ink according to the present invention, hereinafter also referred to as inventive printing process. To practice the inventive printing process, at least one ink jet ink according to the present invention is printed onto a substrate. A preferred version of the inventive printing process comprises printing at least one ink jet ink of the present invention onto a substrate and then treating with actinic radiation.

In the ink jet process, the typically aqueous inks are sprayed as small droplets directly onto the substrate. There is a continuous form of the process, in which the ink is pressed at a uniform rate through a nozzle and the jet is directed onto the substrate by an electric field depending on the pattern to be printed, and there is an interrupted or drop-on-demand process, in which the ink is expelled only where a colored dot is to appear, the latter form of the process employing either a piezoelectric crystal or a heated hollow needle (Bubble or Thermal Jet process) to exert pressure on the ink system and so eject an ink droplet. These techniques are described in Text. Chem. Color, volume 19 (8), pages 23 to 29, 1987, and volume 21 (6), pages 27 to 32, 1989.

The inks of the present invention are particularly useful for the bubble jet process and for the process employing a piezoelectric crystal.

Ink jet inks according to the present invention are curable by actinic radiation. Actinic radiation having a wavelength range from 200 nm to 450 nm is useful for example. Actinic radiation having an energy in the range from 70 mJ/cm$^2$ to 2000 mJ/cm$^2$ is useful for example. Actinic radiation may advantageously be applied continuously or in the form of flashes for example.

In one embodiment of the present invention, the substrate materials after printing and before treatment with actinic radiation can be interdried, for example thermally or with IR radiation. Examples of suitable conditions are temperatures ranging from 30 to 120° C. for a period from 10 seconds to 24 hours, preferably from one up to 30 min, more preferably up to 5 min. Useful IR radiation includes for example IR radiation in a wave region above 800 nm. Useful interdrying apparatuses include for example drying cabinets including vacuum drying cabinets for thermal interdrying, and also IR lamps.

Similarly, the heat evolved upon application of actinic radiation can have an interdrying effect.

Invention inks and prints obtained using invention ink jet inks, however, are also curable thermally, with or without the action of actinic radiation. For instance, prints obtained using invention ink jet inks are fixable by drying at 25 to 150° C., preferably 100 to 150° C., more preferably 120 to 150° C.

The present invention further provides substrates, for example paper, board, comestibles or parts of comestibles, such as for example eggshells, and especially textile substrates, which have been printed by one of the inventive printing processes identified above and which are notable for particularly crisply printed images or drawings and also excellent hand. Moreover, printed substrates according to the present invention have few soft spots.

In a further embodiment of the present invention, two or more and preferably three or more different ink jet process inks according to the present invention can be combined into sets, in which case different inks according to the present invention each comprise different pigments each having a different color.

The present invention further provides at least partially enveloped pigments produced by dispersing at least one pigment (B), at least one polymerization inhibitor (C) and at least one polyurethane (A), said polyurethane (A) being obtainable by reaction of (a) 15% to 70% by weight and preferably 30% to 60% by weight of di- or polyisocyanate comprising on average from 1 to 10 allophanate groups and on average from 1 to 10 C—C double bonds per molecule, and optionally (b) 0% to 60% by weight and preferably to 20% by weight of further di- or polyisocyanate, with (c) 5% to 50% by weight and preferably 30% to 50% by weight of compound having at least two isocyanate-reactive groups, weight % ages being based on total polyurethane (A).

The present invention provides specifically at least partially enveloped above-described pigments wherein said di- or polyisocyanate (a) is prepared by reaction of at least one di- or polyisocyanate (a1) with at least one compound of the general formula I

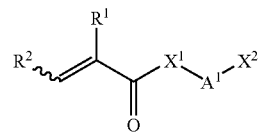

where
R$^1$ and R$^2$ are the same or different and are independently selected from hydrogen and C$_1$-C$_{10}$-alkyl,
X$^1$ is selected from oxygen and N—R$^3$,
A$^1$ is selected from C$_1$-C$_{20}$-alkylene which is unsubstituted or singly or multiply substituted by C$_1$-C$_4$-alkyl, phenyl or O—C$_1$-C$_4$-alkyl, and in which one or more nonadjacent CH$_2$ groups may be replaced by oxygen;
X$^2$ is selected from hydroxyl and NH—R$^3$,
R$^3$ is in each occurrence the same or different and selected from hydrogen, C$_1$-C$_{10}$-alkyl and phenyl.

The present invention provides specifically pigments at least partially enveloped by polyurethane (A) wherein polyurethane (A) is prepared by reaction of (a) 15% to 70% by weight of di- or polyisocyanate comprising on average from 1 to 10 allophanate groups and on average from 1 to 10 C—C double bonds per molecule, and optionally (b) nil to 60% by weight of further di- or polyisocyanate, with (c) 5% to 50% by weight of compound having at least two isocyanate-reactive groups, and (d) at least one compound of the general formula I

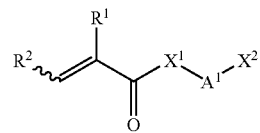

where
R$^1$ and R$^2$ are the same or different and are independently selected from hydrogen and C$_1$-C$_{10}$-alkyl,
X$^1$ is selected from oxygen and N—R$^3$,
A$^1$ is selected from C$_1$-C$_{20}$-alkylene which is unsubstituted or singly or multiply substituted by C$_1$-C$_4$-alkyl, phenyl or O—C$_1$-C$_4$-alkyl, and in which one or more nonadjacent CH$_2$ groups may be replaced by oxygen;
X$^2$ is selected from hydroxyl and NH—R$^3$,
R$^3$ is in each occurrence the same or different and selected from hydrogen, C$_1$-C$_{10}$-alkyl and phenyl.

A process for producing at least partially enveloped pigments according to the present invention is described above and likewise forms part of the subject matter of the present invention.

At least partially enveloped pigments according to the present invention are winnable for example from aqueous dispersions according to the present invention by removing the water, for example by drying, freeze drying, filtration or a combination thereof.

At least partially enveloped pigments according to the present invention are particularly useful for producing inks for the ink jet process.

The present invention further provides polyurethanes (A) prepared by reaction of (a) 15% to 70% by weight, preferably 30% to 60% by weight, of di- or polyisocyanate comprising on average from 1 to 10 allophanate groups and on average from 1 to 10 C—C double bonds per molecule, and (b) optionally nil to 60% by weight, preferably to 20% by weight, of further di- or polyisocyanate, (c) 5% to 50% by weight, preferably 30% to 50% by weight, of compound having at least two isocyanate-reactive groups, and optionally (d) at least one compound of the general formula I.

Weight % ages are all based on total polyurethane (A) of the present invention.

In one embodiment of the present invention, polyurethane (A) of the present invention has a double bond density in the range from 0.1 to 5 mol/kg of (A), preferably in the range from 0.5 to 3 mol/kg of (A) and most preferably in the range from 1 to 2 mol/kg of (A), determinable for example by determination of the hydrogenation iodine number and by $^1$H NMR spectroscopy.

To improve the durability of polyurethane (A) of the present invention, it is admixed with at least one polymerization inhibitor (C) during or immediately after synthesis.

A process for producing polyurethanes (A) according to the present invention is described above and likewise forms part of the subject matter of the present invention.

Polyurethanes (A) according to the present invention are particularly useful for producing ink jet inks according to the present invention and for producing aqueous dispersions according to the present invention.

The invention is illustrated by working examples.

General Preliminaries:

The NCO content was in epch case monitored titrimetrically in accordance with German standard specification DIN 53185.

The degree of envelopment of pigments according to the present invention was determined by transmission electron microscopy using the freeze fracture technique.

Solids content: % ages in the realm of the present invention are all % by weight: Solids contents in the realm of the present invention are all determined by drying at 150° C. for 30 minutes.

Dynamic viscosity was in each case determined at room temperature.

I. Preparation of Inventive at least Partially Enveloped Pigments

I.1. Preparation of Inventive Polyurethane (A.1)

I.1.1 Preparation of Diisocyanate (a.1), which Comprises Allophanate Groups and C—C Double Bonds Example 1.1 of EP 1 144 476 B1 was repeated. Hexamethylene diisocyanate (HDI) (a.1.1) was mixed with 2-hydroxyethyl acrylate and nitrogen and heated to 80° C. in a stirred flask. 200 weight ppm of N,N,N-trimethyl-N-(2-hydroxypropyl)ammonium 2-ethylhexanoate

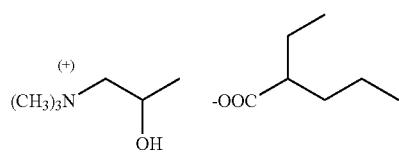

were added and thereafter the temperature was raised to 120° C. within half an hour. Thereafter, the resulting reaction mixture was maintained at 120° C. with continued stirring until the titrimetrically determined NCO content was 25% by weight, based on total reaction mixture. The reaction was stopped by addition of 250 weight ppm of di(2-ethylhexyl) phosphate, based on (a.1.1). The mixture thus obtainable was subsequently freed of unconverted HDI in a thin film evaporator at 135° C. and 2.5 mbar. The thus obtainable diisocyanate (a.1) had an NCO content of 15% by weight, a dynamic viscosity of 1200 mPa·s at 23° C. The residual HDI content was below 0.5% by weight. The C—C double bond density was 2 C—C double bonds per molecule.

I.1.2 Conversion of (a.1) to Inventive Polyurethane (A.1)

75.7 g of a polyesterdiol having a molecular weight $M_w$ of 800 g/mol, prepared by polycondensation of isophthalic acid, adipic acid and 1,4-dihydroxymethylcyclohexane (isomeric mixture) in a molar ratio of 1:1:2, were heated to 120° C. The resultant melt was transferred to a 2 l reactor equipped with stirrer, reflux condenser, gas inlet tube and dropping funnel, and heated to 130° C. under nitrogen. Once the polyesterdiol was present as a clear melt, it was cooled down to 80° C. with stirring. Thereafter, 9.8 g of neopentylglycol and 32.3 g of 1,1-dimethylolpropionic acid and also 0.28 g of polymerization inhibitor (C.1) and 0.14 g of polymerization inhibitor (C.2)

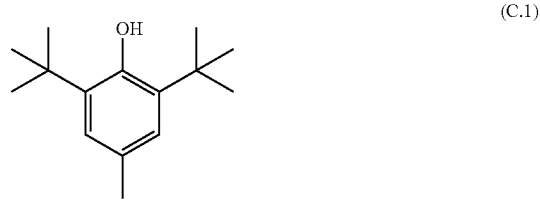

where Me=CH$_3$, were added before cooling down to 60° C. Thereafter, 278.4 g of tetrahydrofuran (THF), 111.4 g of diisocyanate (a.1) and 49.3 g of hexamethylene diisocyanate (HDI) (a.2.1) were added. This was followed by the addition of 0.28 g of di-n-butyltin dilaurate (1000 ppm, based on total solids) and stirring at 60° C. until the titrimetrically determined NCO content had decreased to 0.9% by weight, based on total reaction mixture. Thereafter, an ice bath was used to cool the reaction mixture down to room temperature, and the reaction was stopped by addition of 12.6 g of diethanolamine dissolved in 12.6 g of THF. The acid groups were subsequently neutralized with 24.3 g of triethylamine, dissolved in 24.3 g of THF to obtain inventive polyurethane (A.1). The glass transition temperature $T_g$ of inventive polyurethane (A.1) was 36° C.

I.1.2 Conversion of (a.1) to Inventive Polyurethane (A.2)

63.1 g of a polyesterdiol having a molecular weight $M_w$ of 800 g/mol, prepared by polycondensation of isophthalic acid, adipic acid and 1,4-dihydroxymethylcyclohexane (isomeric mixture) in a molar ratio of 1:1:2, were heated to 120° C. The resultant melt was transferred to a 2 l reactor equipped with stirrer, reflux condenser, gas inlet tube and dropping funnel, and heated to 130° C. under nitrogen. Once the polyesterdiol was present as a clear melt, it was cooled down to 80° C. with stirring. Thereafter, 8.2 g of neopentylglycol and 26.8 g of 1,1-dimethylolpropionic acid and also 0.3 g of polymerization inhibitor (C.1) and 0.15 g of polymerization inhibitor (C.2) were added before cooling down to 60° C. Thereafter, 297.5 g of tetrahydrofuran (THF), 185.6 g of diisocyanate (a.1) and 13.7 g of hexamethylene diisocyanate (HDI) (a.2.1) were added. This was followed by the addition of 0.3 g of di-n-butyltin dilaurate (1000 ppm, based on total solids) and stirring at 60° C. until the titrimetrically determined NCO content had decreased to 0.7% by weight, based on total reaction mixture. Thereafter, an ice bath was used to cool the reaction mixture down to room temperature, and the reaction was stopped by addition of 10.5 g of diethanolamine dissolved in 10.5 g of THF. The acid groups were subsequently neutralized with 20.2 g of triethylamine, dissolved in 20.2 g of THF to obtain inventive polyurethane (A.2). The glass transition temperature $T_g$ of inventive polyurethane (A.2) was 34° C.

I.1.3 Conversion of (a.1) to Inventive Polyurethane (A.3)

75.7 g of a polyesterdiol having a molecular weight $M_w$ of 800 g/mol, prepared by polycondensation of isophthalic acid, adipic acid and 1,4-dihydroxymethylcyclohexane (isomeric mixture) in a molar ratio of 1:1:2, were heated to 120° C. The resultant melt was transferred to a 2 l reactor equipped with stirrer, reflux condenser, gas inlet tube and dropping funnel, and heated to 130° C. under nitrogen. Once the polyesterdiol was present as a clear melt, it was cooled down to 80° C. with stirring. Thereafter, 9.8 g of neopentylglycol and 32.3 g of 1,1-dimethylolpropionic acid and also 0.3 g of polymerization inhibitor (C.1) and 0.14 g of polymerization inhibitor (C.2) were added before cooling down to 60° C. Thereafter, 278.4 g of acetone, 111.4 g of diisocyanate (a.1) and 49.3 g of hexamethylene diisocyanate (HDI) (a.2.1) were added. This was followed by the addition of 0.3 g of di-n-butyltin dilaurate (1000 ppm, based on total solids) and stirring at 60° C. until the titrimetrically determined NCO content had decreased to 0.9% by weight, based on total reaction mixture. Thereafter, an ice bath was used to cool the reaction mixture down to room temperature, and the reaction was stopped by addition of 12.6 g of diethanolamine dissolved in 12.6 g of acetone. The acid groups were subsequently neutralized with 24.3 g of triethylamine, dissolved in 24.3 g of acetone to obtain inventive polyurethane (A.3). The glass transition temperature $T_g$ of inventive polyurethane (A.2) was 32° C.

I.2. Production of Inventive Aqueous Dispersions of at Least Partially Enveloped Pigments, General Prescription Inventive aqueous dispersions were produced on a Skandex shaking apparatus using 60 g of glass balls (0.25-0.5 mm in diameter). The recipes are summarized in Table 1. After the ingredients and the glass balls have been weighed into the Skandex, the resulting mixture was shaken for a time reported in Table 1. Thereafter, a sample was taken and the average diameter of dispersed pigment determined (Coulter Counter LS230) and also the degree of envelopment measured. The pH was measured and if necessary—adjusted to 8-8.5 with triethanolamine. Inventive aqueous dispersions WD.1 to WD.3 were obtained.

TABLE 1

Ingredients and recipe parameters for inventive aqueous dispersions WD.1 to WD.3

| Ingredient | WD.1 | WD.2 | WD.3 |
|---|---|---|---|
| (B) [g] | 6 | 6 | 6 |
| (A.1) [g] | 6 | — | — |
| (A.2) [g] | — | 6 | — |
| (A.3) [g] | — | — | 6 |
| Biocide 1 [g] | 0.2 | 0.2 | 0.2 |
| (G.1) [g] | 0.08 | 0.08 | 0.08 |
| (G.2) [g] | 2 | 2 | 2 |
| Distilled water [g] | 25.72 | 25.72 | 25.72 |
| Dispersing time [h] | 2 | 2 | 2 |

TABLE 1-continued

Ingredients and recipe parameters for inventive aqueous dispersions WD.1 to WD.3

| Ingredient | WD.1 | WD.2 | WD.3 |
|---|---|---|---|
| Average diameter of pigment [nm] | 61 | 74 | 65 |

Amounts of ingredients are always reported in g unless expressly stated otherwise.
(B): P.R. 122 as per C.I.
(A.2) is reckoned on the solids content.

Biocide 1 is 20% by Weight Solution of 1,2-benzisothiazolin-3-one in Propylene Glycol Admixtures:

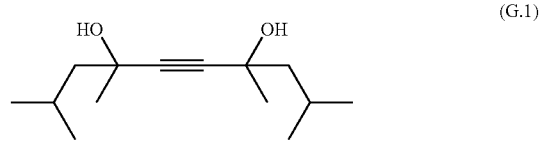 [SMILES: CC(C)CC(C)(O)C#CC(C)(O)CC(C)C]

(G.1)

(G.2): Polyethylene glycol, $M_n$ 200 g/mol.

II. Formulation of Inventive Inks for Ink Jet Process

II.1 Formulation of Inventive Magenta Ink T.1 for Ink Jet Process

The following were mixed with one another by stirring in a glass beaker:
20 g of WD.1,
1 g of urea,
0.36 g of photoinitiator (E.1)
3 g of polyethylene glycol of average molecular weight $M_n$ 200 g/mol
4.5 g of 1,2-pentanediol
13 g of glycerol,
0.4 g of a 20% by weight solution of benzisothiazolin-3-one in propylene glycol,
0.05 g of ethoxylated trisiloxane of the formula [(CH$_3$)$_3$Si—O]$_2$—Si(CH$_3$)—O—(CH$_2$)$_3$—O(CH$_2$CH$_2$O)$_8$—H
0.2 g of triethanolamine
57.69 g of distilled water.

The inventive ink T.1 was obtained after filtering through a glass fiber filter (cutoff size 1 μm). The inventive ink T.1 had a pH of 8.9 and a dynamic viscosity of 3.4 mPa·s.

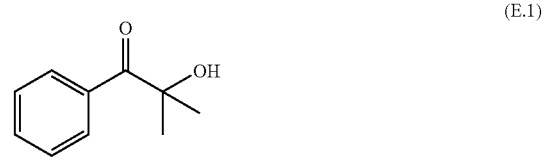

(E.1)

II.2 Formulation of Inventive Magenta Ink T.2 for Ink Jet Process

The following were mixed with one another by stirring in a glass beaker:
20 g of WD.2,
1 g of urea,
3 g of polyethylene glycol of average molecular weight $M_n$ 200 g/mol
4.5 g of 1,2-pentanediol
13 g of glycerol,
0.4 g of a 20% by weight solution of benzisothiazolin-3-one in propylene glycol, 0.05 g of ethoxylated trisiloxane of the formula [(CH$_3$)$_3$Si-O]$_2$—Si(CH$_3$)—O—(CH$_2$)$_3$—O(CH$_2$CH$_2$O)$_8$—H 57.49 g of distilled water.

The inventive ink T.2 was obtained after filtering through a glass fiber filter (cutoff size 1 μm). The inventive ink T.2 had a pH of 8.4 and a dynamic viscosity of 3.7 mPa·s.

II.3 Formulation of Inventive Magenta Ink T.3 for Ink Jet Process

The following were mixed with one another by stirring in a glass beaker:
20 g of WD.3,
1 g of urea,
0.36 g of photoinitiator (E.1)
3 g of polyethylene glycol of average molecular weight Mr, 200 g/mol
4.5 g of 1,2-pentanediol
13 g of glycerol,
0.4 g of a 20% by weight solution of benzisothiazolin-3-one in propylene glycol,
0.05 g of ethoxylated trisiloxane of the formula [(CH$_3$)$_3$Si—O]$_2$—Si(CH$_3$)—O—(CH$_2$)$_3$—O(CH$_2$CH$_2$O)$_8$—H
0.2 g of triethanolamine
57.49 g of distilled water.

The inventive ink T.3 was obtained after filtering through a glass fiber filter (cutoff size 1 μm). The inventive ink T.3 had a pH of 9.1 and a dynamic viscosity of 3.5 mPa·s.

III. Printing Trials with Inventive Inks for Ink Jet Process

The inventive inks T.1, T.2 and T.3 were each filled into a cartridge and printed onto untreated cotton using a Mimaki TX2 720 printer at 720 dpi. Prints were obtained without nozzle cloggage.

This was followed by fixing according to three variants:
variant 1 was exposure to actinic radiation without thermal drying,
variant 2 was thermal drying without subsequent exposure to light,
variant 3 was exposure to actinic radiation with subsequent thermal drying.

Thermal drying involved drying in a drying cabinet at 150° C. for 5 minutes.

Irradiation with actinic radiation was implemented using a UV irradiator from 1ST having two different UV lamps: Eta Plus M-400-U2H, Eta Plus M-400-U2HC. The exposure period was for 10 seconds with an input of 600 mJ/cm$^2$ of energy.

The inventive printed substrates S1.1 to S1.3, S2.1 to S2.3 and S3.1 to S3.3 as per table 2 were obtained and the rubfastness was determined according to ISO-105-D02:1993 and the washfastness according to ISO 105-C06:1994.

TABLE 2

Fastnesses of cotton printed according to invention

| Ink | Curing variant | Substrate | Rubfastness (dry) | Rubfastness (wet) | Washfastness |
|---|---|---|---|---|---|
| T.1 | 1 | S1.1 | 2-3 | 2 | 3 |
| T.1 | 2 | S1.2 | 3 | 2-3 | 4 |
| T.1 | 3 | S1.3 | 4 | 3-4 | 4 |
| T.2 | 1 | S2.1 | 3 | 3 | 4 |
| T.2 | 2 | S2.2 | 4 | 3 | 4 |
| T.2 | 3 | S2.3 | 4 | 3-4 | 4-5 |
| T.3 | 1 | S3.1 | 2-3 | 1-2 | 2-3 |
| T.3 | 2 | S3.2 | 4 | 2-3 | 3-4 |
| T.3 | 3 | S3.3 | 4 | 2-3 | 3-4 |

We claim:

1. An aqueous dispersion comprising a pigment (B) at least partially enveloped by a polyurethane (A) and further comprising at least one polymerization inhibitor (C), said polyurethane (A) having been obtained by the reaction of
   (a) 30% to 70% by weight of di- or polyisocyanate comprising on average from 1 to 10 allophanate groups and on average from 1 to 10 C—C double bonds per molecule, and
   (b) 0% to 60% by weight of an additional di- or polyisocyanate, with
   (c) 30% to 50% by weight of a compound having at least two isocyanate-reactive groups,
   wherein the weight percentages are based on the total polyurethane (A).

2. The aqueous dispersion according to claim 1, wherein said di- or polyisocyanate (a) is prepared by the reaction of at least one di- or polyisocyanate (a1) with at least one compound of the general formula I

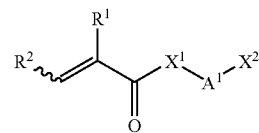

where
R$^1$ and R$^2$ are the same or different and are independently selected from the group consisting of hydrogen and C$_1$-C$_{10}$-alkyl,
X$^1$ is selected from the group consisting of oxygen and N—R$^3$,
A$^1$ is a C$_1$-C$_{20}$-alkylene which is unsubstituted or singly or multiply substituted by C$_1$-C$_4$-alkyl, phenyl or O—C$_1$-C$_4$-alkyl, and in which one or more nonadjacent CH$_2$ groups may be replaced by oxygen,
X$^2$ is selected from the group consisting of hydroxyl and NH—R$^3$, and
R$^3$ is in each occurrence the same or different and selected from the group consisting of hydrogen, a C$_1$-C$_{10}$-alkyl and phenyl.

3. The aqueous dispersion according to claim 1, wherein said compound having at least two isocyanate-reactive groups (c) comprises at least one member selected from the group consisting of a 1,1,1-trimethylol-C$_1$-C$_4$-alkylcarboxylic acid, citric acid, a 1,1-dimethylol-C$_1$-C$_4$-alkylcarboxylic acid, a 1,1-dimethylol-C$_1$-C$_4$-alkylsulfonic acid, a poly-C$_2$-C$_3$-alkylene glycol having on average from 3 to 300 C$_2$-C$_3$-alkylene oxide units per molecule, a hydrophilic polyamine having COOM or SO$_3$M groups, and a polyesterdiol prepared by the polycondensation of at least one aliphatic or cycloaliphatic diol with at least one aliphatic, aromatic or cycloaliphatic dicarboxylic acid, wherein M of said hydrophilic polyamine represents an alkali metal ion or an ammonium ion.

4. The aqueous dispersion according to claim 1, which further comprises at least one polyurethane (D) which is obtained by the reaction of a di- or polyisocyanate (b) with a compound having at least two isocyanate-reactive groups (c).

5. The aqueous dispersion according to claim 4, wherein said pigment (B) is partially enveloped by polyurethane (D).

6. The aqueous dispersion according to claim 1, wherein said polyurethane (A) has a glass transition temperature T$_g$ of not more than 60° C.

7. The aqueous dispersion according to claim 1, which further comprises at least one photoinitiator (E).

8. The aqueous dispersion according to claim 1, wherein said polyurethane (A) is prepared by the reaction of
(a) 30% to 70% by weight of di- or polyisocyanate comprising on average from 1 to 10 allophanate groups and on average from 1 to 10 C—C double bonds per molecule, and
(b) 0% to 60% by weight of an additional di- or polyisocyanate, with
(c) 30% to 50% by weight of compound having at least two isocyanate-reactive groups, and
(d) a compound of the general formula I

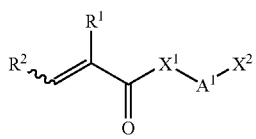

where
$R^1$ and $R^2$ are the same or different and are independently selected from the group consisting of hydrogen and a $C_1$-$C_{10}$-alkyl,
$X^1$ is selected from the group consisting of oxygen and N—$R^3$,
$A^1$ is a $C_1$-$C_{20}$-alkylene which is unsubstituted or singly or multiply substituted by $C_1$-$C_4$-alkyl, phenyl or O—$C_1$-$C_4$-alkyl, and in which one or more nonadjacent $CH_2$ groups may be replaced by oxygen,
$X^2$ is selected from the group consisting of hydroxyl and NH—$R^3$, and
$R^3$ is in each occurrence the same or different and selected from the group consisting of hydrogen, a $C_1$-$C_{10}$-alkyl and phenyl,
wherein the weight percentages are based on the total polyurethane (A).

9. A process for producing aqueous dispersions according to claim 1, which comprises dispersing at least one pigment (B) with at least one polyurethane (A) and at least one polymerization inhibitor (C) and optionally adding at least one polyurethane (D) before or after said dispersing.

10. The process according to claim 9 wherein said dispersing is effected in a ball mill.

11. A formulation for dyeing or printing substrates comprising the aqueous dispersion according to claim 1.

12. A process for dyeing or printing a substrate, which comprises contacting a substrate with at least one aqueous dispersion according to claim 1.

13. A substrate dyed or printed by a process according to claim 12.

14. A process for producing inks for the ink jet process, which comprises incorporating at least one aqueous dispersion according to claim 1 into an ink.

15. An ink for the ink jet process which comprises at least one aqueous dispersion according to claim 1.

16. A process for printing on a substrate, which comprises contacting a substrate with inks for the ink jet process according to claim 15.

17. A printed substrate obtained by a process according to claim 16.

18. An at least partially enveloped pigment produced by dispersing at least one pigment (B), at least one polymerization inhibitor (C) and at least one polyurethane (A), said polyurethane (A) having been obtained by the reaction of
(a) 30% to 70% by weight of di- or polyisocyanate comprising on average from 1 to 10 allophanate groups and on average from 1 to 10 C—C double bonds per molecule, and
(b) 0% to 60% by weight of an additional di- or polyisocyanate, with
(c) 30% to 50% by weight of a compound having at least two isocyanate-reactive groups,
wherein the weight percentages are based on the total polyurethane (A).

19. The at least partially enveloped pigment according to claim 18, wherein said di- or polyisocyanate (a) is prepared by the reaction of at least one di-or polyisocyanate (a1) with at least one compound of the general formula I

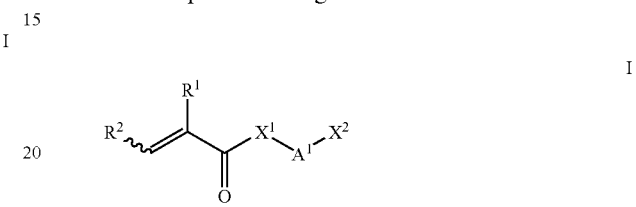

where
$R^1$ and $R^2$ are the same or different and are independently selected from the group consisting of hydrogen and a $C_1$-$C_{10}$-alkyl,
$X^1$ is selected from the group consisting of oxygen and N—$R^3$,
$A^1$ is a $C_1$-$C_{20}$-alkylene which is unsubstituted or singly or multiply substituted by $C_1$-$C_4$-alkyl, phenyl or O—$C_1$-$C_4$-alkyl, and in which one or more nonadjacent $CH_2$ groups may be replaced by oxygen,
$X^2$ is selected from the group consisting of hydroxyl and NH—$R^3$, and
$R^3$ is in each occurrence the same or different and selected from the group consisting of hydrogen, a $C_1$-$C_{10}$-alkyl and phenyl.

20. The at least partially enveloped pigment according to claim 18, wherein said polyurethane (A) is prepared by the reaction of
(a) 30% to 70% by weight of di- or polyisocyanate comprising on average from 1 to 10 allophanate groups and on average from 1 to 10 C—C double bonds per molecule, and
(b) 0% to 60% by weight of an additional di- or polyisocyanate, with
(c) 30% to 50% by weight of compound having at least two isocyanate-reactive groups, and
(d) compound of the general formula I

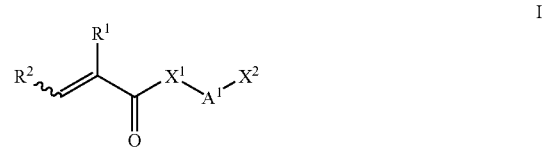

where
$R^1$ and $R^2$ are the same or different and are independently selected from the group consisting of hydrogen and a $C_1$-$C_{10}$-alkyl,
$X^1$ is selected from the group consisting of oxygen and N—$R^3$,
$A^1$ is a $C_1$-$C_{20}$-alkylene which is unsubstituted or singly or multiply substituted by $C_1$-$C_4$-alkyl, phenyl or O—$C_1$-

$C_4$-alkyl, and in which one or more nonadjacent $CH_2$ groups may be replaced by oxygen, $X^2$ is selected from the group consisting of hydroxyl and NH—$R^3$, and $R^3$ is in each occurrence the same or different and selected from the group consisting of hydrogen, a $C_1$-$C_{10}$-alkyl and phenyl.

21. A polyurethane prepared by the reaction of
(a) 30% to 70% by weight of di- or polyisocyanate comprising on average from 1 to 10 allophanate groups and on average from 1 to 10 C—C double bonds per molecule, and
(b) 0% to 60% by weight of an additional di- or polyisocyanate, with
(c) 30% to 50% by weight of compound having at least two isocyanate-reactive groups, and
(d) at least one compound of the general formula I

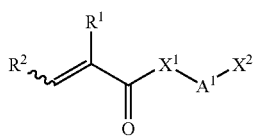

where
$R^1$ and $R^2$ are the same or different and are independently selected from the group consisting of hydrogen and a $C_1$-$C_{10}$-alkyl, $X^1$ is selected from the group consisting of oxygen and N—$R^3$, $A^1$ is a $C_1$-$C_{20}$-alkylene which is unsubstituted or singly or multiply substituted by $C_1$-$C_4$-alkyl, phenyl or O—$C_1$-$C_4$-alkyl, and in which one or more nonadjacent $CH_2$ groups may be replaced by oxygen, $X^2$ is selected from the group consisting of hydroxyl and NH—$R^3$, and $R^3$ is in each occurrence the same or different and selected from the group consisting of hydrogen, $C_1$-$C_{10}$-alkyl and phenyl, wherein the weight percentages are based on the total polyurethane.

22. The aqueous dispersion according to claim 1, wherein the amount of the di- or polyisocyanate comprising on average from 1 to 10 allophanate groups and on average from 1 to 10 C—C double bonds per molecule is from 30% to 60% by weight.

23. The at least partially enveloped pigment according to claim 18, wherein the amount of the di- or polyisocyanate comprising on average from 1 to 10 allophanate groups and on average from 1 to 10 C—C double bonds per molecule is from 30% to 60% by weight.

24. The polyurethane according to claim 21, wherein the amount of the di- or polyisocyanate comprising on average from 1 to 10 allophanate groups and on average from 1 to 10 C—C double bonds per molecule is from 30% to 60% by weight.

* * * * *